(12) United States Patent
Miura et al.

(10) Patent No.: US 10,726,845 B2
(45) Date of Patent: Jul. 28, 2020

(54) METHOD FOR PRESENTING SOUND, NON-TRANSITORY RECORDING MEDIUM, SOUND PRESENTATION SYSTEM, AND TERMINAL APPARATUS

(71) Applicant: Panasonic Intellectual Property Management Co., Ltd., Osaka (JP)

(72) Inventors: Koji Miura, Osaka (JP); Hikaru Usami, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 177 days.

(21) Appl. No.: 15/980,746

(22) Filed: May 16, 2018

(65) Prior Publication Data

US 2018/0268823 A1    Sep. 20, 2018

Related U.S. Application Data

(63) Continuation of application No. PCT/JP2017/016512, filed on Apr. 26, 2017.

(30) Foreign Application Priority Data

Sep. 13, 2016 (JP) .................. 2016-178304
Apr. 7, 2017 (JP) .................. 2017-076694

(51) Int. Cl.
*G10L 15/22* (2006.01)
*G10L 15/32* (2013.01)
(Continued)

(52) U.S. Cl.
CPC .............. *G10L 15/32* (2013.01); *G06F 9/454* (2018.02); *G06F 16/635* (2019.01);
(Continued)

(58) Field of Classification Search
CPC ............................. G06F 40/284; H04L 29/08
See application file for complete search history.

(56) References Cited

U.S. PATENT DOCUMENTS 7,028,304 B1 * 4/2006 Weinberger ............ G06Q 10/10
709/227
2004/0236578 A1    11/2004 Shields
(Continued)

FOREIGN PATENT DOCUMENTS

JP          2005-520459        7/2005
JP          3119135 U          2/2006
(Continued)

OTHER PUBLICATIONS

International Search Report of PCT application No. PCT/JP2017/016512 dated Jun. 27, 2017.
(Continued)

*Primary Examiner* — Abul K Azad
(74) *Attorney, Agent, or Firm* — Greenblum & Bernstein, P.L.C.

(57) ABSTRACT

A method for presenting a sound, a non-transitory recording medium, a sound presentation system, and a terminal apparatus capable of improving the comfort of a user are provided. A communication unit obtains an announcement sound announced from an utterer to a user in an airplane and a degree of importance of the announcement sound. Next, an in-flight broadcasting priority control unit determines, on the basis of the obtained degree of importance, whether to present the announcement sound to the user. If the in-flight broadcasting priority control unit determines that the announcement sound is to be presented to the user, an in-flight broadcasting control unit transmits the announcement sound to an entertainment terminal used by the user.

11 Claims, 16 Drawing Sheets

(51) Int. Cl.
    *G06F 16/635*     (2019.01)
    *G06F 40/58*     (2020.01)
    *G06F 40/284*     (2020.01)
    *G06F 9/451*     (2018.01)
    *G10L 15/26*     (2006.01)
    *G10L 13/00*     (2006.01)

(52) U.S. Cl.
    CPC ............ *G06F 40/284* (2020.01); *G06F 40/58* (2020.01); *G10L 15/265* (2013.01); *G10L 13/00* (2013.01); *G10L 15/26* (2013.01)

(56) References Cited

U.S. PATENT DOCUMENTS

| | | |
|---|---|---|
| 2004/0243392 A1 | 12/2004 | Chino et al. |
| 2006/0095249 A1 | 5/2006 | Kong et al. |
| 2011/0219136 A1 | 9/2011 | DeLuca et al. |
| 2012/0274643 A1 | 11/2012 | Tanaka |
| 2012/0311022 A1* | 12/2012 | Watanabe ............. G06F 9/5083 709/203 |
| 2013/0197725 A1* | 8/2013 | O'Dell .................. H04L 67/125 701/14 |
| 2014/0214466 A1* | 7/2014 | Francis .................. G06Q 50/30 705/7.13 |
| 2016/0012801 A1* | 1/2016 | Nishimura ............... G09G 5/30 345/581 |
| 2016/0248865 A1* | 8/2016 | Dotan-Cohen ......... H04L 67/26 |

FOREIGN PATENT DOCUMENTS

| | | |
|---|---|---|
| JP | 2006-512647 | 4/2006 |
| JP | 2007-052329 | 3/2007 |
| JP | 2010-079091 | 4/2010 |
| JP | 2012-238305 | 12/2012 |

OTHER PUBLICATIONS

The Extended European Search Report dated May 8, 2019 for the related European Patent Application No. 17850477.5.

* cited by examiner

FIG. 4

| DEGREE OF IMPORTANCE | IMPORTANT WORD |
|---|---|
| HIGH | SEAT BELT |
| MODERATE | IN-FLIGHT SERVICE, DRINK, MEAL, DUTY-FREE GOODS, SELL |
| LOW | CREW ANNOUNCEMENT |

METHOD FOR PRESENTING SOUND, NON-TRANSITORY RECORDING MEDIUM, SOUND PRESENTATION SYSTEM, AND TERMINAL APPARATUS

BACKGROUND

1. Technical Field

The present disclosure relates to a method for presenting a sound, a non-transitory recording medium, a sound presentation system, and a terminal apparatus that present, to a user, an announcement sound announced from an utterer to the user.

2. Description of the Related Art

During these years, multilingual announcements for foreign passengers are made in transportation facilities, tourist vehicles, or the like. The announcements are not only output in a broadcasting manner using speakers provided for the vehicles but also individually output from passenger terminals in many cases.

For example, a crew member or a pilot announces various pieces of information to passengers in an airplane. Passenger seats are equipped with entertainment terminals, and the passengers can watch movies and the like using the entertainment terminals. The crew member or the pilot makes announcements using a microphone, and broadcast speakers in the airplane or earphones or headphones connected to the entertainment terminals output the announcements. The crew member or the pilot usually makes announcements in a few major languages.

As a multilingual communication method for making announcements to a group of individuals, for example, Japanese Unexamined Patent Application Publication No. 2006-512647 has been disclosed. In the multilingual communication method disclosed in Japanese Unexamined Patent Application Publication No. 2006-512647, individuals are provided with access to selection of a plurality of languages, display of the language selected by the individuals are received from one or more individuals, the selected language is stored in a database, a language accessible in one or more applications is selected, and, when selectively operated, the applications provide outputs for the individuals in the selected language.

SUMMARY

Japanese Unexamined Patent Application Publication (Translation of PCT Application) No. 2006-512647, however, needs further improvements.

In one general aspect, the techniques disclosed here feature a method for presenting a sound. The method includes obtaining an announcement sound announced from an utterer to a user in an airplane and a degree of importance of the announcement sound, the degree of importance including a first degree of importance, a second degree of importance, which is lower than the first degree of importance, and a third degree of importance, which is lower than the second degree of importance, determining, if the first degree of importance is obtained, that the announcement sound is to be presented to the user, determining, if the second degree of importance is obtained, that the announcement sound is not to be presented to the user and the announcement sound having the second degree of importance is stored in a sound storage, determining, if the third degree of importance is obtained, that the announcement sound is not to be presented to the user, transmitting, if it is determined that the announcement sound is to be presented to the user, the announcement sound to a terminal apparatus used by the user, and reading, if it is determined that the announcement sound is not to be presented to the user and a request to obtain the announcement sound stored in the sound storage is received from the terminal apparatus, the announcement sound from the sound storage and transmitting the announcement sound to the terminal apparatus.

According to the above aspect, further improvements can be achieved.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4 is a diagram illustrating an example of a degree of importance table;

DETAILED DESCRIPTION

Figure 1:
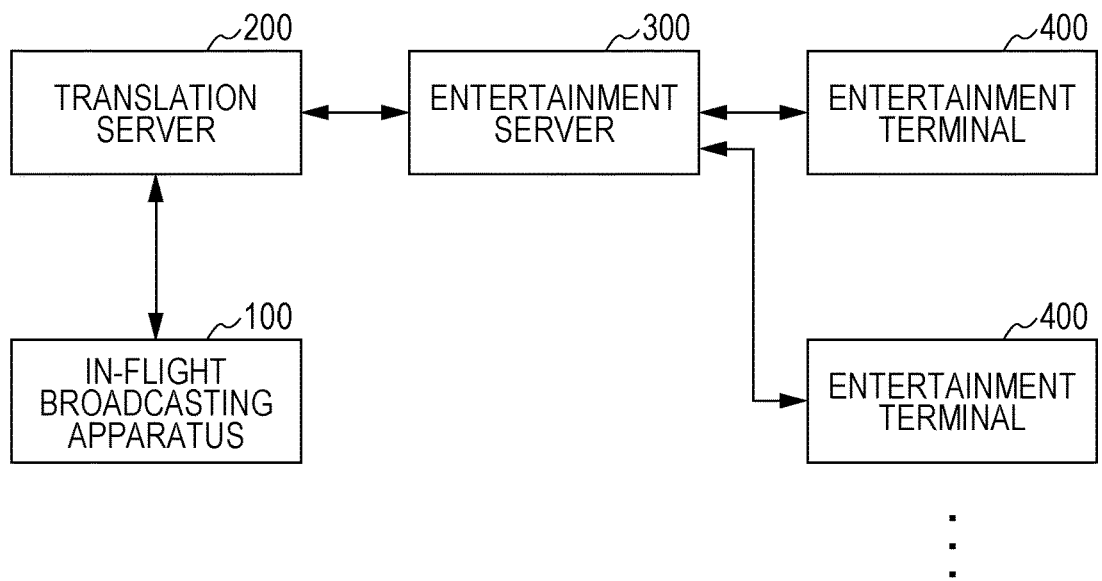
FIG. 1 is a diagram illustrating the configuration of a sound presentation system according to an embodiment of the present disclosure.

Underlying Knowledge Forming Basis of Present Disclosure

First, a viewpoint of an aspect of the present disclosure will be described.

During these years, multilingual announcements for foreign passengers are made in transportation facilities, tourist vehicles, or the like. The announcements are not only output in a broadcasting manner using speakers provided for the vehicles but also individually output from passenger terminals in many cases.

For example, a crew member or a pilot announces various pieces of information to passengers in an airplane. Passenger seats are equipped with entertainment terminals, and the passengers can watch movies and the like using the entertainment terminals. The crew member or the pilot makes announcements using a microphone, and broadcast speakers in the airplane or earphones or headphones connected to the entertainment terminals output the announcements. The crew member or the pilot usually makes announcements in a few major languages.

As a multilingual communication method for making announcements to a group of individuals, for example, Japanese Unexamined Patent Application Publication No. 2006-512647 has been disclosed. In the multilingual communication method disclosed in Japanese Unexamined Patent Application Publication No. 2006-512647, the individuals are provided with access to selection of a plurality of languages, display of the language selected by the individuals are received from one or more individuals, the selected language is stored in a database, a language accessible in one or more applications is selected, and, when selectively operated, the applications provide outputs for the individuals in the selected language.

When a crew member or a pilot makes an announcement through conventional entertainment terminals provided inside an airplane, however, playback of contents such as movies is stopped and an announcement sound is output from headphones even while the contents are being played back. The crew member or the pilot makes not only announcements about safety but also announcements about in-flight services. Such announcements about in-flight services are not necessarily essential information for passengers. If such announcements prevent passengers from watching contents, the passengers might feel uncomfortable, which impairs comfort.

In order to solve the above problem, a method for presenting a sound includes obtaining an announcement sound announced from an utterer to a user in an airplane and a degree of importance of the announcement sound, the degree of importance including a first degree of importance, a second degree of importance, which is lower than the first degree of importance, and a third degree of importance, which is lower than the second degree of importance, determining, if the first degree of importance is obtained, that the announcement sound is to be presented to the user, determining, if the second degree of importance is obtained, that the announcement sound is not to be presented to the user and the announcement sound having the second degree of importance is stored in a sound storage, determining, if the third degree of importance is obtained, that the announcement sound is not to be presented to the user, transmitting, if it is determined that the announcement sound is to be presented to the user, the announcement sound to a terminal apparatus used by the user, and reading, if it is determined that the announcement sound is not to be presented to the user and a request to obtain the announcement sound stored in the sound storage is received from the terminal apparatus, the announcement sound from the sound storage and transmitting the announcement sound to the terminal apparatus.

With this configuration, an announcement sound announced from an utterer to a user in an airplane and a degree of importance of the announcement sound are obtained. Whether to present the announcement sound to the user is determined on the basis of the obtained degree of importance. If it is determined that the announcement sound is to be presented to the user, the announcement sound is transmitted to a terminal apparatus used by the user.

Since whether to present the announcement sound to the user is determined in accordance with the degree of importance and, if it is determined that the announcement sound is to be presented to the user, the announcement sound is presented to the user, therefore, announcement sounds whose degrees of importance are high are presented to the user and announcement sounds whose degrees of importance are low are blocked without being presented to the user. As a result, the comfort of the user improves.

In addition, the method may further include generating a speech text by performing speech recognition on the announcement sound, referring to a degree of importance storage unit storing a degree of importance and a word while associating the degree of importance and the word with each other, and determining, from the degree of importance storage unit, a degree of importance associated with a word included in the speech text.

With this configuration, a speech text is generated by performing speech recognition on the announcement sound. A degree of importance storage unit storing a degree of importance and a word while associating the degree of importance and the word with each other is referred to, and a degree of importance associated with a word included in the speech text is determined from the degree of importance storage unit.

Since the degree of importance storage unit storing the degree of importance and the word while associating the degree of importance and the word with each other is referred to and the degree of importance associated with the word included in the speech text is determined from the degree of importance storage unit, therefore, degrees of importance of announcements sound can be easily determined.

In addition, in the method, a first language used by the utterer for speech and a second language used by the user for speech may be different from each other. The method may further include generating a speech translation text by translating the speech text into the second language, generating an announcement translation sound by performing speech synthesis on the speech translation text, further obtaining the announcement translation sound, determining, on the basis of the obtained degree of importance, whether to present the announcement translation sound to the user, and transmitting, if it is determined that the announcement translation sound is to be presented to the user, the announcement translation sound to the terminal apparatus.

With this configuration, a first language used by the utterer for speech and a second language used by the user for speech are different from each other. A speech translation text is generated by translating the speech text into the second language. An announcement translation sound is generated by performing speech synthesis on the speech translation text. The announcement translation sound is further obtained. Whether to present the announcement translation sound to the user is determined on the basis of the obtained degree of importance. If it is determined that the announcement translation sound is to be presented to the user, the announcement translation sound is transmitted to the terminal apparatus.

An announcement sound uttered by an utterer, therefore, can be translated into a language used by a user for speech and output.

In addition, the method may further include receiving an input regarding the degree of importance of the announcement sound uttered by the utterer.

With this configuration, since an input regarding the degree of importance of the announcement sound uttered by the utterer is received and the received degree of importance and the announcement sound are obtained, the utterer can determine the degree of importance.

In addition, the method may further include obtaining a condition around the user, and determining, if the obtained condition is a certain condition, that the announcement sound is to be presented to the user and transmitting the announcement sound to the terminal apparatus.

With this configuration, a condition around the user is obtained, and, if the obtained condition is a certain condition, it is determined that the announcement sound is to be presented to the user and the announcement sound is transmitted to the terminal apparatus.

Since an announcement sound is presented to a user when a condition around the user is a certain condition, therefore, an announcement sound can be presented to the user in consideration of the condition around the user.

In addition, in the method, the condition may be a weather condition that changes during flight of the airplane boarded by the user.

With this configuration, an announcement sound can be presented to the user in consideration of a weather condition that changes during flight of the airplane boarded by the user.

In addition, the method may further include receiving, from the terminal apparatus, block information indicating that the announcement sound having a certain degree of importance is to be blocked, and determining, on the basis of the degree of importance and the block information, whether to present the announcement sound to the user.

With this configuration, whether to present announcements to be presented to the user can be dynamically changed. As a result, announcements suitable for each user can be presented.

In addition, the method may further include transmitting, if it is determined on the basis of the degree of importance and the block information that the announcement sound is not to be presented to the user, notification information for notifying the user that the announcement sound is accumulated.

With this configuration, the terminal apparatus can be notified that an announcement has been blocked. As a result, it becomes possible to prevent the user from missing the announcement.

In addition, the method may further include receiving, from the terminal apparatus, a request to obtain detailed information regarding a certain part of the announcement sound transmitted to the terminal apparatus, and transmitting the detailed information to the terminal apparatus.

With this configuration, detailed information regarding an announcement can be presented to the terminal apparatus in accordance with a request from the terminal apparatus. As a result, desired information can be presented to the user in proper amount.

A non-transitory recording medium according to another aspect of the present disclosure stores thereon a computer program, which, when executed by a processor, causes the processor to perform operations including obtaining an announcement sound announced from an utterer to a user in an airplane and a degree of importance of the announcement sound, determining, if the degree of importance is a first degree of importance, that the announcement sound is to be presented to the user, determining, if the degree of importance is a second degree of importance, which is lower than the second degree of importance, that the announcement sound is not to be presented to the user and storing the announcement sound having the second degree of importance in a sound storage, determining, if the degree of importance is a third degree of importance, which is lower than the second degree of importance, that the announcement sound is not to be presented to the user, and transmitting, if it is determined that the announcement sound is to be presented to the user, the announcement sound to a terminal apparatus used by the user and reading, if it is determined that the announcement sound is not to be presented to the user and a request to obtain the announcement sound stored in the sound storage is received from the terminal apparatus, the announcement sound from the sound storage and transmitting the announcement sound to the terminal apparatus.

With this configuration, an announcement sound announced from an utterer to a user in an airplane and a degree of importance of the announcement sound are obtained. Whether to present the announcement sound to the user is determined on the basis of the obtained degree of importance. If it is determined that the announcement sound is to be presented to the user, the announcement sound is transmitted to a terminal apparatus used by the user.

Since whether to present the announcement sound to the user is determined in accordance with the degree of importance and, if it is determined that the announcement sound is to be presented to the user, the announcement sound is presented to the user, therefore, announcement sounds whose degrees of importance are high are presented to the user and announcement sounds whose degrees of importance are low are blocked without being presented to the user. As a result, the comfort of the user improves.

A system according to another aspect of the present disclosure includes a server and a terminal apparatus communicably connected to the server and used by a user. The server includes a first processor and a first memory storing thereon a computer program, which, when executed by the first processor, causes the first processor to perform operations including obtaining an announcement sound announced from an utterer to the user in an airplane and a degree of importance of the announcement sound, determining, if the degree of importance is a first degree of importance, that the announcement sound is to be presented to the user, determining, if the degree of importance is a second degree of importance, which is lower than the second degree of importance, that the announcement sound is not to be presented to the user and storing the announcement sound having the second degree of importance in a sound storage, determining, if the degree of importance is a third degree of importance, which is lower than the second degree of importance, that the announcement sound is not to be presented to the user, and transmitting, if it is determined that the announcement sound is to be presented to the user, the announcement sound to a terminal apparatus used by the user and reading, if it is determined that the announcement sound is not to be presented to the user and a request to obtain the announcement sound stored in the sound storage is received from the terminal apparatus, the announcement sound from the sound storage and transmitting the announcement sound to the terminal apparatus. The terminal apparatus includes a second processor, and a second memory storing thereon a computer program, which, when executed by the second processor, causes the second processor to perform operations including receiving the announcement sound, and outputting the announcement sound.

With this configuration, the server obtains an announcement sound announced from an utterer to a user in an airplane and a degree of importance of the announcement sound. The server determines, on the basis of the obtained degree of importance, whether to present the announcement sound to the user. If determining that the announcement sound is to be presented to the user, the server transmits the announcement sound to a terminal apparatus used by the user. The terminal apparatus receives and outputs the announcement sound.

Since whether to present the announcement sound to the user is determined in accordance with the degree of importance and, if it is determined that the announcement sound is to be presented to the user, the announcement sound is presented to the user, therefore, announcement sounds whose degrees of importance are high are presented to the user and announcement sounds whose degrees of importance are low are blocked without being presented to the user. As a result, the comfort of the user improves.

A terminal apparatus according to another aspect of the present disclosure includes a processor and a memory storing thereon a computer program, which, when executed by the processor, causes the processor to perform operations including transmitting, if a server determines that an announcement sound announced from an utterer to a user in an airplane is not to be presented to the user, a request to obtain the announcement sound to the user to the server, receiving, from the server, the announcement sound as a response to the request, and outputting the received announcement sound.

With this configuration, the terminal apparatus can later playback an announcement sound that has not been presented from a server. As a result, the convenience of the user improves while maintaining the comfort of the user.

In addition, the terminal apparatus may further include receiving an input indicating whether to block the announcement sound having a certain degree of importance. In the transmitting, block information indicating that the announcement sound having the certain degree of importance is to be blocked in accordance with the input may be transmitted to the server.

With this configuration, announcements to be presented to a user can be set by the user. As a result announcements according to each user's demands can be presented.

In addition, the terminal apparatus may further include receiving an input to a screen output in the outputting. In the outputting, a screen indicating the announcement sound determined by the server not to be presented to the user may be output. In the transmitting, the request to obtain an announcement sound may be transmitted to the server on the basis of an input to the screen indicating the announcement sound determined by the server not to be presented to the user.

With this configuration, announcements to be played back can be selected by a user. As a result, the user can later play back only desired announcements, which improves the convenience.

In addition, the terminal apparatus may further include receiving an input to a certain part of the announcement sound. In the transmitting, a request to obtain detailed information regarding the certain part of the announcement sound is transmitted to the server in accordance with the input to the certain part of the announcement sound. In the receiving, the detailed information may be received from the server. In the outputting, the detailed information may be output.

With this configuration, detailed information regarding an announcement can be presented in accordance with the user's demands. As a result, desired information can be presented to the user in proper amount.

Embodiment

An embodiment of the present disclosure will be described hereinafter with reference to the accompanying drawings. The following embodiment is a specific example of the present disclosure and does not limit the technical scope of the present disclosure.

FIG. 1 is a diagram illustrating the configuration of a sound presentation system according to the embodiment of the present disclosure. The sound presentation system illustrated in FIG. 1 includes an in-flight broadcasting apparatus 100, a translation server 200, an entertainment server 300, and entertainment terminals 400. The sound presentation system according to the present embodiment is provided inside an airplane.

The in-flight broadcasting apparatus 100 obtains announcement sounds announced from an utterer (a crew member or a pilot) to users (passengers).

The translation server 200 determines degrees of importance of announcement sounds and translates the announcement sounds into languages different from one used by the utterer. The in-flight broadcasting apparatus 100 and the translation server 200 are communicably connected to each other.

The entertainment server 300 determines whether to present an announcement sound to the users (passengers) in accordance with a degree of importance. The translation server 200 and the entertainment server 300 are communicably connected to each other.

The entertainment terminals 400 are provided for passenger seats and used by the passengers. The entertainment server 300 and the entertainment terminals 400 are communicably connected to each other. The entertainment server 300 is connected to a plurality of entertainment terminals 400. The plurality of entertainment terminals 400 each have the same configuration.

Figure 2:
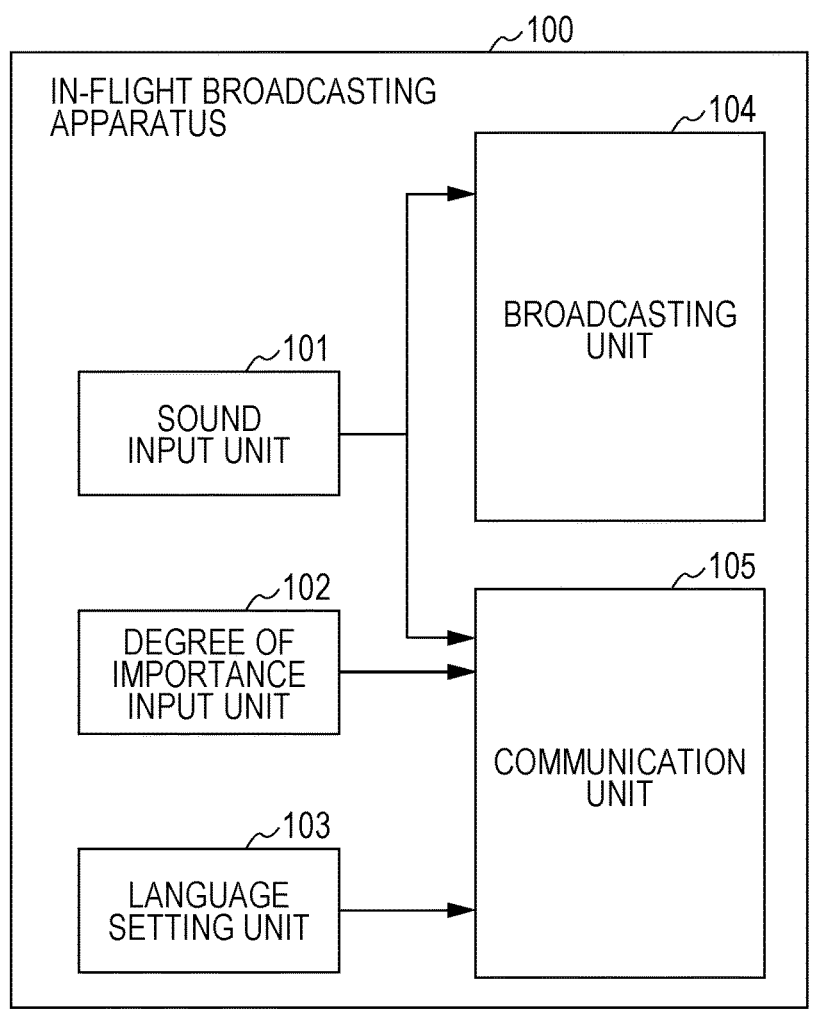
FIG. 2 is a diagram illustrating the configuration of an in-flight broadcasting apparatus according to the embodiment of the present disclosure.

FIG. 2 is a diagram illustrating the configuration of the in-flight broadcasting apparatus according to the embodiment of the present disclosure.

The in-flight broadcasting apparatus 100 illustrated in FIG. 2 includes a sound input unit 101, a degree of importance input unit 102, a language setting unit 103, a broadcasting unit 104, and a communication unit 105.

The sound input unit 101 is a microphone, for example, and obtains a sound uttered by the utterer (a crew member or a pilot) to generate an analog sound signal. The crew member or the pilot announces various pieces of information such as information regarding services provided for the passengers in the airplane, information regarding the safety of the airplane, information regarding a destination, and information regarding flight conditions. The sound input unit 101 obtains an announcement sound announced by the utterer.

The degree of importance input unit 102 receives an input regarding a degree of importance of an announcement sound announced by the utterer. The utterer can input a degree of importance of an announcement sound to be uttered thereby before uttering the announcement sound. The degree of importance can be one of three levels, namely, for example, "high", "moderate", and "low". The degree of importance can be input using buttons or a touch panel provided for the in-flight broadcasting apparatus 100. The degree of importance input unit 102 may receive an input regarding the degree of importance after the utterer utters an announcement sound, not before the utterer utters the announcement sound. In addition, as described later, the degree of importance can be identified from an announcement sound and need not necessarily be input.

The language setting unit 103 receives an input regarding a setting of a language used by the utterer. The utterer inputs a language to be used thereby. The language to be used can be input using the buttons or the touch panel provided for the in-flight broadcasting apparatus 100. The language to be used is, for example, English or an official language of a country to which the airplane belongs.

The broadcasting unit 104 is a speaker, for example, and outputs an announcement sound obtained by the sound input unit 101. A plurality of speakers are provided for the airplane and output the announcement sound.

The communication unit 105 communicates data with the translation server 200 through wired or wireless communication. The communication unit 105 transmits an announcement sound obtained by the sound input unit 101 to the translation server 200. Here, a format conversion section, which is not illustrated, converts the announcement sound, which is an analog sound signal, into a digital sound signal through, for example, pulse-code modulation (PCM). The communication unit 105 transmits, to the translation server 200, the announcement sound converted into the digital sound signal, language information indicating a language of the announcement sound, and announcement sound information including a degree of importance input by the degree of importance input unit 102. As described above, the announcement sound information need not include the degree of importance and may include only the announcement sound and the language information.

Figure 3:
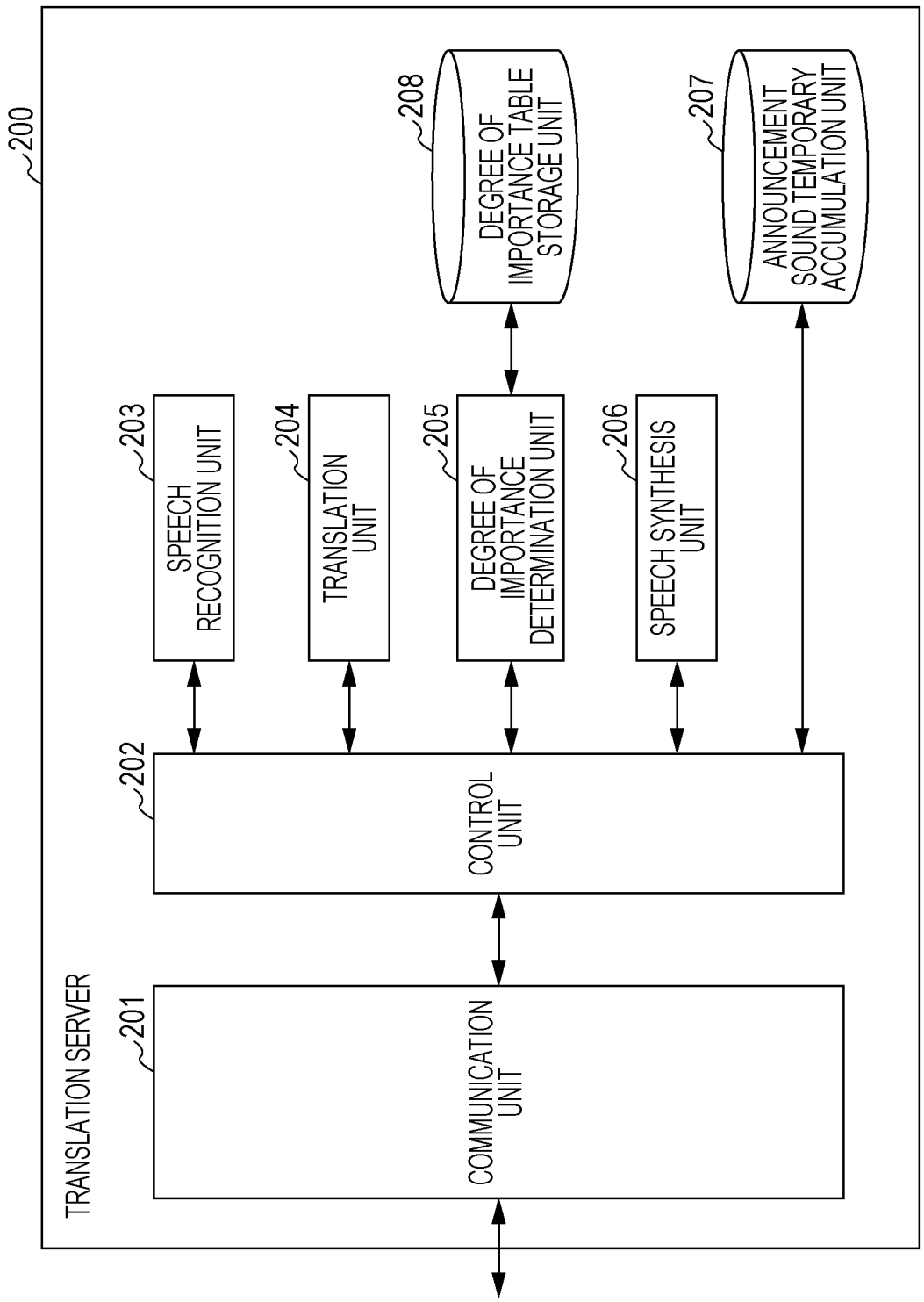
FIG. 3 is a diagram illustrating the configuration of a translation server according to the embodiment of the present disclosure.

FIG. 3 is a diagram illustrating the configuration of the translation server according to the embodiment of the present disclosure.

The translation server 200 illustrated in FIG. 3 includes a communication unit 201, a control unit 202, a speech recognition unit 203, a translation unit 204, a degree of importance determination unit 205, a speech synthesis unit 206, an announcement sound temporary accumulation unit 207, and a degree of importance table storage unit 208.

The communication unit 201 communicates data with the in-flight broadcasting apparatus 100 and the entertainment server 300 through wired or wireless communication. The communication unit 201 receives announcement sound information transmitted from the in-flight broadcasting apparatus 100.

The control unit 202 is a central processing unit (CPU), for example, and controls the communication unit 201, the speech recognition unit 203, the translation unit 204, the degree of importance determination unit 205, the speech synthesis unit 206, and the announcement sound temporary accumulation unit 207 in order to determine a degree of importance of an announcement sound, translate the announcement sound, and perform speech synthesis on the announcement sound.

The speech recognition unit 203 generates a speech text by performing speech recognition on an announcement sound.

The translation unit 204 generates a speech translation text by translating a speech text generated by the speech recognition unit 203. The translation unit 204 translates a speech text into all languages that can be set by the entertainment terminals 400. If a language of a speech text is Japanese and languages that can be set by the entertainment terminals 400 are English, Chinese, and French, for example, the translation unit 204 translates the Japanese speech text into English, Chinese, and French to generate English, Chinese, and French speech translation texts.

The degree of importance table storage unit 208 stores a degree of importance table in which degrees of importance and important words are associated with each other. FIG. 4 is a diagram illustrating an example of the degree of importance table. As described above, the degree of importance can be one of three levels, namely, for example, "high", "moderate", and "low". The highest degree of importance "high" is associated with, for example, an important word "seat belt". The second highest degree of importance "moderate" is associated with, for example, important words "in-flight service", "drink", "meal", "duty-free goods", and "sell". The lowest degree of importance "low" is associated with, for example, an important word "crew announcement".

The degree of importance table may be updated through machine learning. For example, the control unit 202 may extract, from a plurality of texts, a word that frequently appears with an important word whose degree of importance is "high" and store the extracted word in the degree of importance table while associating the extracted word with the degree of importance "high" as an important word.

If announcement sound information received by the communication unit 201 includes a degree of importance input by the degree of importance input unit 102, the control unit 202 may extract a word that frequently appears in a speech text generated by performing speech recognition on an announcement sound and store the extracted word in the degree of importance table while associating the extracted word with the degree of importance.

The degree of importance determination unit 205 refers to the degree of importance table in which the degrees of importance and the important words are associated with each other and determines, on the basis of the degree of importance table, a degree of importance associated with a word included in a speech text. If the word "seat belt" is included in the speech text, for example, the degree of importance determination unit 205 determines that a degree of importance of the speech text is "high".

The speech synthesis unit 206 generates an announcement translation sound by performing speech synthesis on a speech translation text obtained by translating a speech text.

The announcement sound temporary accumulation unit 207 temporarily accumulates announcement sound information received by the communication unit 201.

In addition, the communication unit 201 transmits an announcement sound and a degree of importance of the announcement sound to the entertainment server 300. The communication unit 201 transmits, to the entertainment server 300, announcement sound information including an announcement sound received from the in-flight broadcasting apparatus 100, a speech text obtained by converting the announcement sound into a text, an announcement translation sound obtained by translating the announcement sound into a certain language, a speech translation text obtained by translating the speech text into a certain language, language information indicating a language of the announcement sound, language information indicating the language of the announcement translation sound, a degree of importance determined by the degree of importance determination unit 205, important words included in the speech text, and translated important words included in the speech translation text.

If announcement sound information received by the communication unit 201 includes a degree of importance input by the degree of importance input unit 102, the degree of importance determination unit 205 need not determine a degree of importance of a speech text. In this case, the degree of importance determination unit 205 determines the degree of importance included in the announcement sound information as the degree of importance of the speech text.

Alternatively, even if announcement sound information received by the communication unit 201 includes a degree of importance input by the degree of importance input unit 102, the degree of importance determination unit 205 may determine a degree of importance. In this case, the control unit 202 determines whether the degree of importance input by the degree of importance input unit 102 and the degree of importance determined by the degree of importance determination unit 205 match. If so, the control unit 202 transmits the degree of importance to the entertainment server 300. If not, the control unit 202 transmits a predetermined one of the two degrees of importance to the entertainment server 300.

Figure 5:
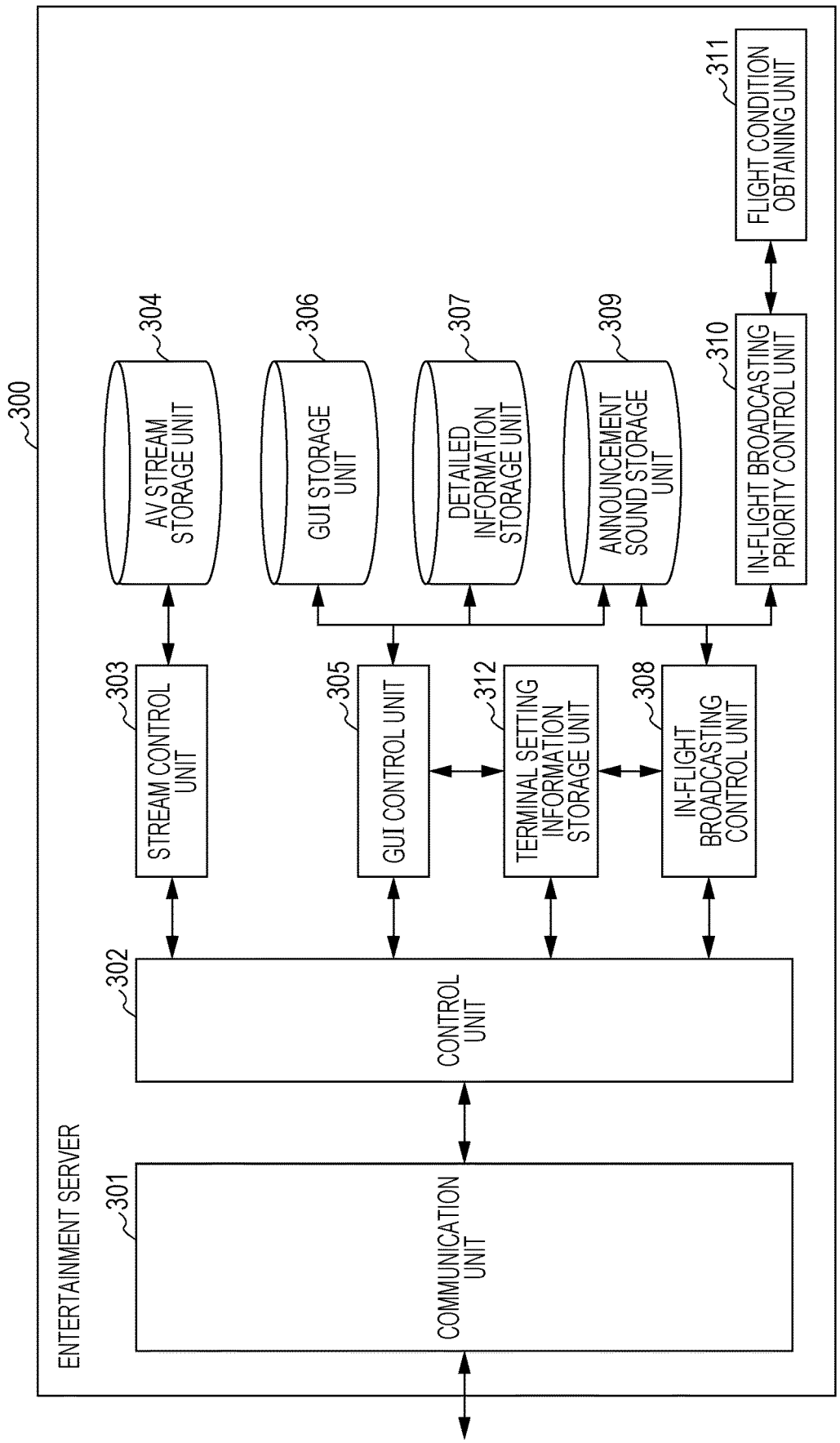
FIG. 5 is a diagram illustrating the configuration of an entertainment server according to the embodiment of the present disclosure.

FIG. 5 is a diagram illustrating the configuration of the entertainment server according to the embodiment of the present disclosure.

The entertainment server 300 illustrated in FIG. 5 includes a communication unit 301, a control unit 302, a stream control unit 303, an audio-visual (AV) stream storage unit 304, a graphical user interface (GUI) control unit 305, a GUI storage unit 306, a detailed information storage unit 307, an in-flight broadcasting control unit 308, an announcement sound storage unit 309, an in-flight broadcasting priority control unit 310, a flight condition obtaining unit 311, and a terminal setting information storage unit 312.

The communication unit 301 communicates data with the translation server 200 and the entertainment terminals 400 through wired or wireless communication. The communication unit 301 receives announcement sound information transmitted from the translation server 200. The communication unit 301 obtains an announcement sound and a degree of importance of the announcement sound.

The control unit 302 controls the communication unit 301, the stream control unit 303, the GUI control unit 305, the in-flight broadcasting control unit 308, and the terminal setting information storage unit 312 in order to transmit AV streams, various display screens, and announcement sounds to the entertainment terminals 400.

The AV stream storage unit 304 stores AV streams of various contents such as movies.

The stream control unit 303 receives, from the entertainment terminals 400, requests to play back AV streams of various contents such as movies, reads the AV streams according to the requests from the AV stream storage unit 304, and transmits the read AV streams to the entertainment terminals 400 through the communication unit 301.

The GUI storage unit 306 stores various display screens to be displayed on the entertainment terminals 400.

The detailed information storage unit 307 stores important words and detailed information, which describes the important words in detail, while associating the important words and the detailed information with each other.

The GUI control unit 305 reads display screens to be displayed on the entertainment terminals 400 from the GUI storage unit 306 and transmits the read display screens to the entertainment terminals 400 through the communication unit 301. The GUI control unit 305 receives, from the entertainment terminals 400, important words for which detailed information is to be displayed, reads the detailed information corresponding to the received important words from the detailed information storage unit 307, and transmits the read detailed information to the entertainment terminals 400 through the communication unit 301.

The terminal setting information storage unit 312 stores terminal identifiers (IDs) for identifying the entertainment terminals 400, language information indicating languages set on the entertainment terminals 400 in which the users (passengers) watch contents, and block information set on the entertainment terminals 400 indicating whether to block announcement sounds while associating the terminal IDs, the language information, and the block information with one another.

The flight condition obtaining unit 311 obtains the flight conditions of the airplane during flight using various sensors provided for the airplane. The flight conditions is, for example, weather conditions that change during flight, such as air turbulence, changes in atmospheric pressure, changes in wind speed, changes in wind direction, and weather.

The in-flight broadcasting priority control unit 310 determines whether to present an announcement sound to the users in accordance with an obtained degree of importance. If the in-flight broadcasting priority control unit 310 determines that an announcement sound is to be presented to the users, the in-flight broadcasting control unit 308 transmits the announcement sound to the entertainment terminals 400 through the communication unit 301.

If a degree of importance is "high", the in-flight broadcasting priority control unit 310 determines that an announcement sound is to be presented to the users. If a degree of importance is "low", the in-flight broadcasting priority control unit 310 determines that an announcement sound is not to be presented to the users. If a degree of importance is "moderate", the in-flight broadcasting priority control unit 310 determines that an announcement sound is not to be immediately presented to the users, but stores the announcement sound in the announcement sound storage unit 309. The announcement sound stored in the announcement sound storage unit 309 is presented to the users in accordance with requests from the entertainment terminals 400.

In addition, the in-flight broadcasting control unit 308 refers to the terminal setting information storage unit 312 and transmits, to the entertainment terminals 400, an announcement sound or an announcement translation sound to be presented in accordance with languages of the users. The in-flight broadcasting control unit 308 determines whether to present an announcement translation sound in accordance with an obtained degree of importance. If determining that an announcement translation sound is to be presented to a user, the in-flight broadcasting control unit 308 transmits the announcement translation sound to the entertainment terminal 400 used by the user.

The in-flight broadcasting control unit 308 stores announcement sound information in the announcement sound storage unit 309 in accordance with degrees of importance. If the in-flight broadcasting priority control unit 310 determines that an announcement sound is not to be presented to the users, the in-flight broadcasting control unit 308 stores the announcement sound in the announcement sound storage unit 309 without transmitting the announcement sound to the entertainment terminals 400. The in-flight broadcasting control unit 308 stores announcement sound information whose degree of importance is "high" or "moderate" in the announcement sound storage unit 309 but does not store announcement sound information whose degree of importance is "low" in the announcement sound storage unit 309.

The announcement sound storage unit 309 stores announcement sound information.

If flight conditions obtained by the flight condition obtaining unit 311 are certain flight conditions, the in-flight broadcasting priority control unit 310 determines that an announcement sound is to be presented to the users regardless of a degree of importance of the announcement sound, and transmits the announcement sound to the entertainment terminals 400.

Figure 6:
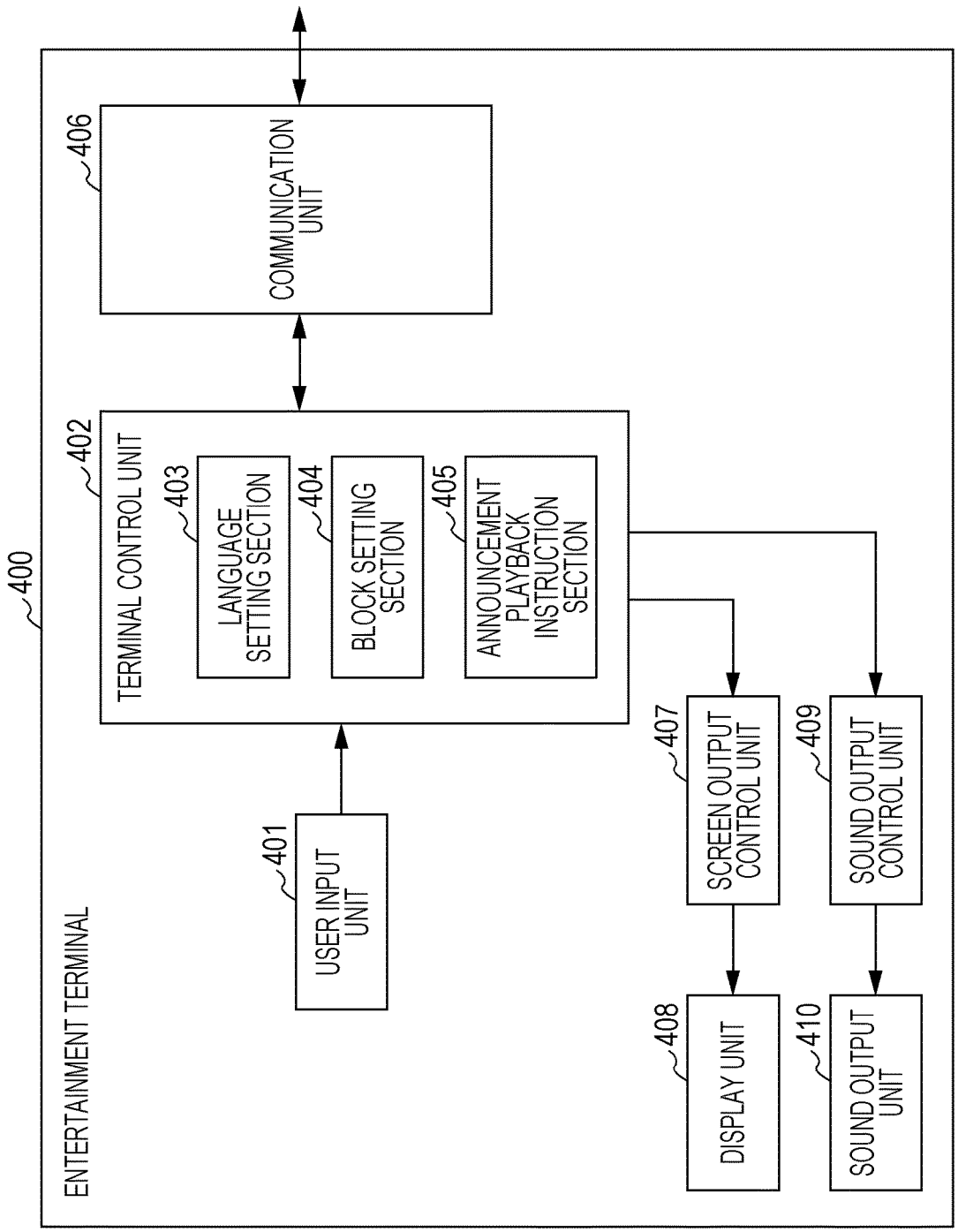
FIG. 6 is a diagram illustrating the configuration of an entertainment terminal according to the embodiment of the present disclosure.

FIG. 6 is a diagram illustrating the configuration of each entertainment terminal according to the present embodiment of the present disclosure.

The entertainment terminal 400 illustrated in FIG. 6 includes a user input unit 401, a terminal control unit 402, a communication unit 406, a screen output control unit 407, a display unit 408, a sound output control unit 409, and a sound output unit 410.

The user input unit 401 is a touch panel, for example, and receives various inputs from the user. The user input unit 401 receives an input regarding a language to be used by the user. The user input unit 401 receives an input as to whether to block announcement sounds. The user input unit 401 receives an input regarding an announcement sound playback instruction to play back an announcement sound stored in the entertainment server 300. The user input unit 401 receives selection of an AV stream to be played back.

The terminal control unit 402 includes a language setting section 403, a block setting section 404, and an announcement playback instruction section 405.

The language setting section 403 sets a language to be used by the user received by the user input unit 401.

The block setting section 404 sets whether to block announcement sounds. If announcement sounds are not to be blocked, all the announcement sounds are output regardless of the degree of importance. If announcement sounds are to be blocked, important announcement sounds are output, but unimportant announcement sounds are not output. For example, announcement sounds whose degrees of importance are "high" are output, and announcement sounds whose degrees of importance are "low" are not output. Announcement sounds whose degrees of importance are "moderate" are not immediately output but can be output later in accordance with instructions from the user.

The announcement playback instruction section 405 transmits, to the entertainment server 300, an announcement sound playback instruction to play back an announcement sound stored in the entertainment server 300.

The communication unit 406 communicates data with the entertainment server 300 through wired or wireless communication. The communication unit 406 receives a display screen transmitted from the entertainment server 300. The communication unit 406 receives an AV stream transmitted from the entertainment server 300. The communication unit 406 receives an announcement sound or an announcement translation sound transmitted from the entertainment server 300.

In addition, the communication unit 406 transmits a language set by the language setting section 403 to the entertainment server 300 along with a terminal ID for identifying the entertainment terminal 400. The communication unit 406 also transmits, to the entertainment server 300, block information, which has been set by the block setting section 404, indicating whether to block announcement sounds along with the terminal ID. The terminal ID is stored in the entertainment terminal 400 in advance.

The screen output control unit 407 controls the display unit 408 in such a way as to display a display screen received by the communication unit 406. The display unit 408 displays the display screen on the basis of the control performed by the screen output control unit 407.

The sound output control unit 409 controls the sound output unit 410 in such a way as to output an announcement sound or an announcement translation sound received by the communication unit 406. The sound output unit 410 is an earphone or a headphone, for example, and outputs an announcement sound or an announcement translation sound.

A process for setting an utterer language performed by the in-flight broadcasting apparatus 100 according to the present embodiment will be described.

Figure 7:
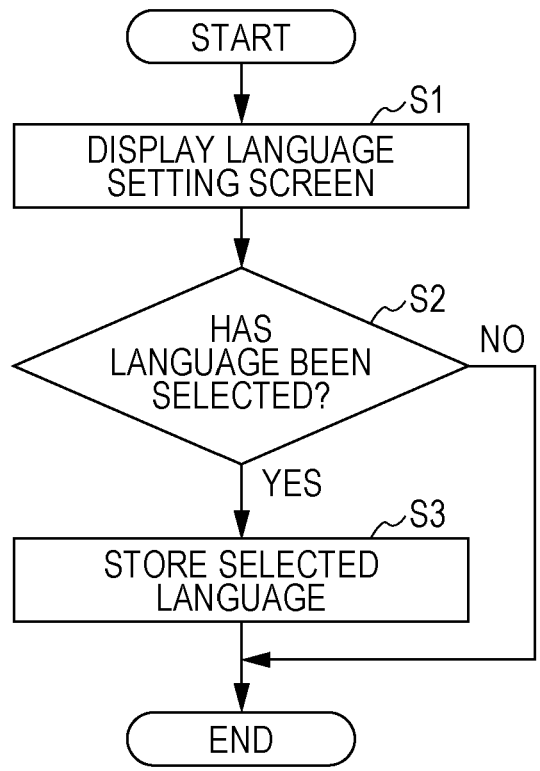
FIG. 7 is a flowchart illustrating a process for setting an utterer language performed by the in-flight broadcasting apparatus according to the present embodiment.

FIG. 7 is a flowchart illustrating the process for setting an utterer language performed by the in-flight broadcasting apparatus 100 according to the present embodiment.

Figure 8:
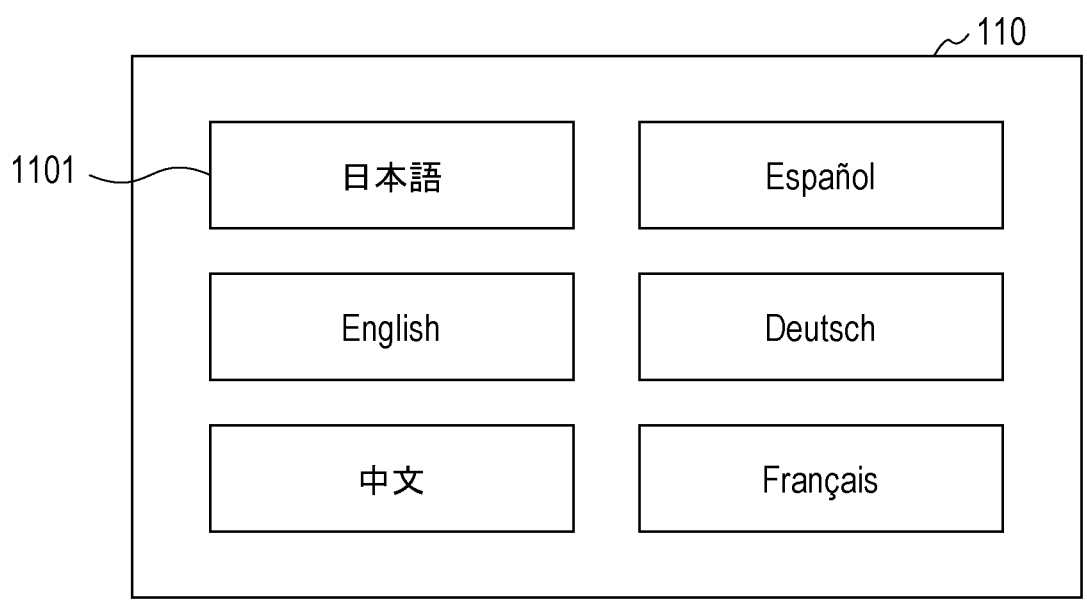
FIG. 8 is a diagram illustrating an example of an utterer language setting screen.

First, in step S1, the language setting unit 103 of the in-flight broadcasting apparatus 100 displays an utterer language setting screen on a display unit. FIG. 8 is a diagram illustrating an example of the utterer language setting screen. As illustrated in FIG. 8, an utterer language setting screen 110 displays language images 1101 indicating a plurality of languages in a selectable manner. The display unit of the in-flight broadcasting apparatus 100 is a touch panel, for example, and displays the language images 1101 indicating the plurality of languages in a selectable manner. The utterer (a crew member or a pilot) selects a language image corresponding to a language to be used thereby from the plurality of language images 1101.

Next, in step S2, the language setting unit 103 determines whether the utterer has selected a language. Here, if the language setting unit 103 determines that the utterer has not selected a language (NO in step S2), the language setting unit 103 stops displaying the utterer language setting screen.

If the language setting unit 103 determines that the utterer has selected a language (YES in step S2), on the other hand, the language setting unit 103, in step S3, stores the language selected by the utterer. As a result of the above process, the language used by the crew member or the pilot is set.

Next, a process for setting a user language performed by each entertainment terminal 400 and the entertainment server 300 according to the present embodiment will be described.

Figure 9:
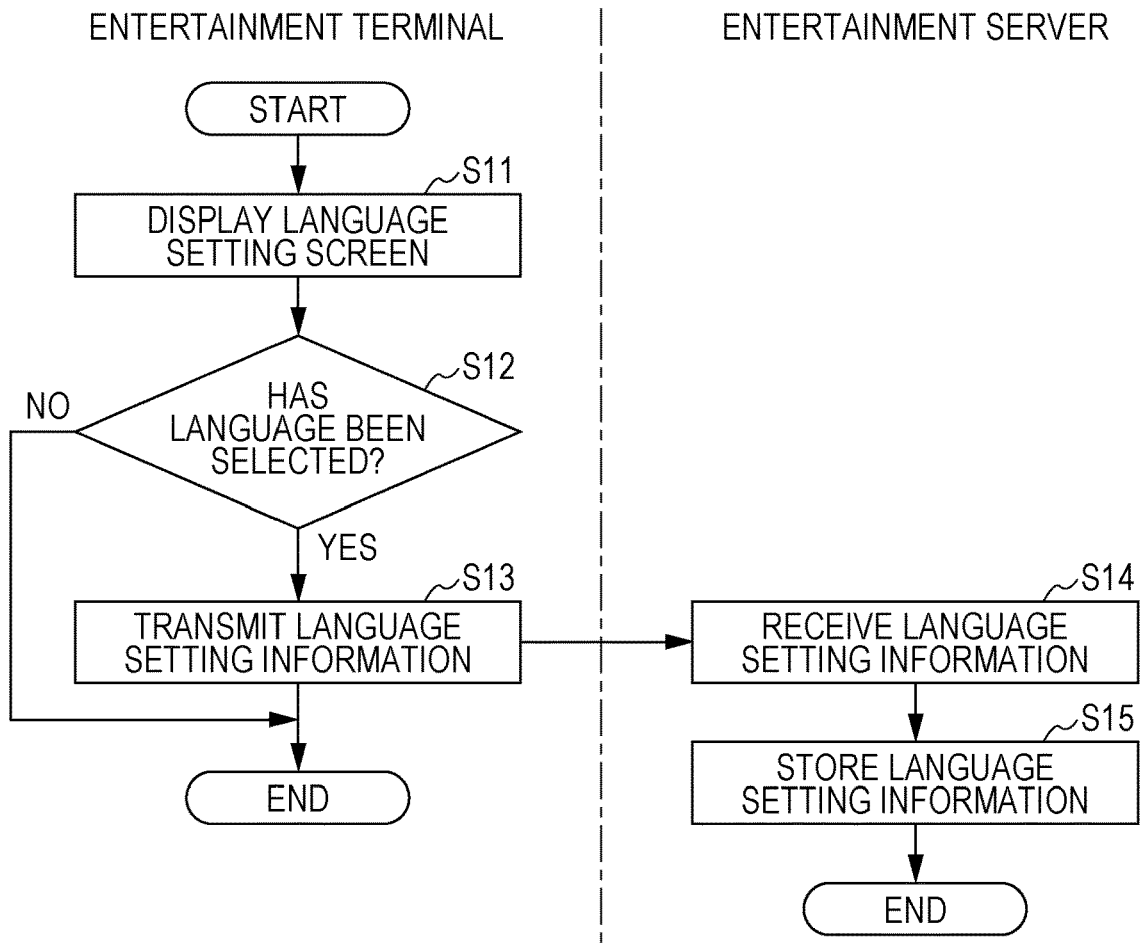
FIG. 9 is a flowchart illustrating a process for setting a user language performed by the entertainment terminal and the entertainment server according to the present embodiment.

FIG. 9 is a flowchart illustrating the process for setting a user language performed by each entertainment terminal and the entertainment server according to the present embodiment.

Figure 10:
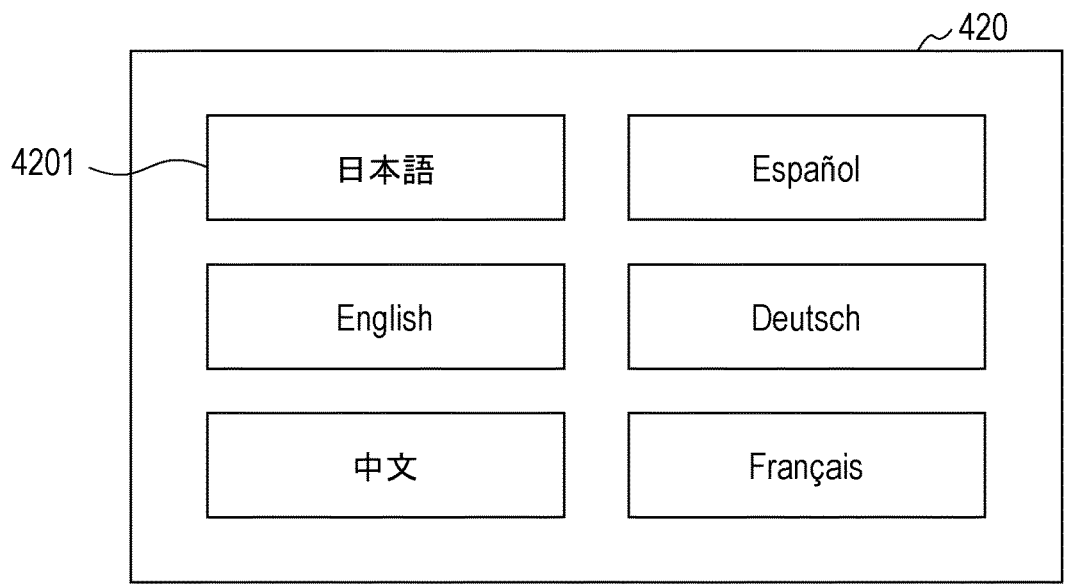
FIG. 10 is a diagram illustrating an example of a user language setting screen.

First, in step S11, the language setting section 403 of the entertainment terminal 400 displays a user language setting screen on the display unit 408. FIG. 10 is a diagram illustrating an example of the user language setting screen. As illustrated in FIG. 10, a user language setting screen 420 displays language images 4201 indicating a plurality of languages. The display unit 408 of the entertainment terminal 400 is a touch panel, for example, and displays the language images 4201 indicating the plurality of languages in a selectable manner. The user (passenger) selects a language image corresponding to a language to be used thereby from the plurality of language images 4201.

Next, in step S12, the language setting section 403 determines whether the user has selected a language. Here, if the language setting section 403 determines that the user has not selected a language (NO in step S12), the language setting section 403 stops displaying the user language setting screen.

If the language setting section 403 determines that the user has selected a language (YES in step S12), on the other hand, the language setting section 403, in step S13, transmits, to the entertainment server 300, language setting information including language information indicating the language selected by the user and a terminal ID for identifying the entertainment terminal 400.

Next, in step S14, the communication unit 301 of the entertainment server 300 receives the language setting information transmitted from the entertainment terminal 400.

Next, in step S15, the control unit 302 stores the language setting information received by the communication unit 301 in the terminal setting information storage unit 312. As a result, the terminal setting information storage unit 312 stores the terminal ID and the language information indicating the language of sound output from the entertainment terminal 400 having the terminal ID while associating the terminal ID and the language information with each other.

Next, a process for setting sound blocking performed by each entertainment terminals 400 and the entertainment server 300 according to the present embodiment will be described.

Figure 11:
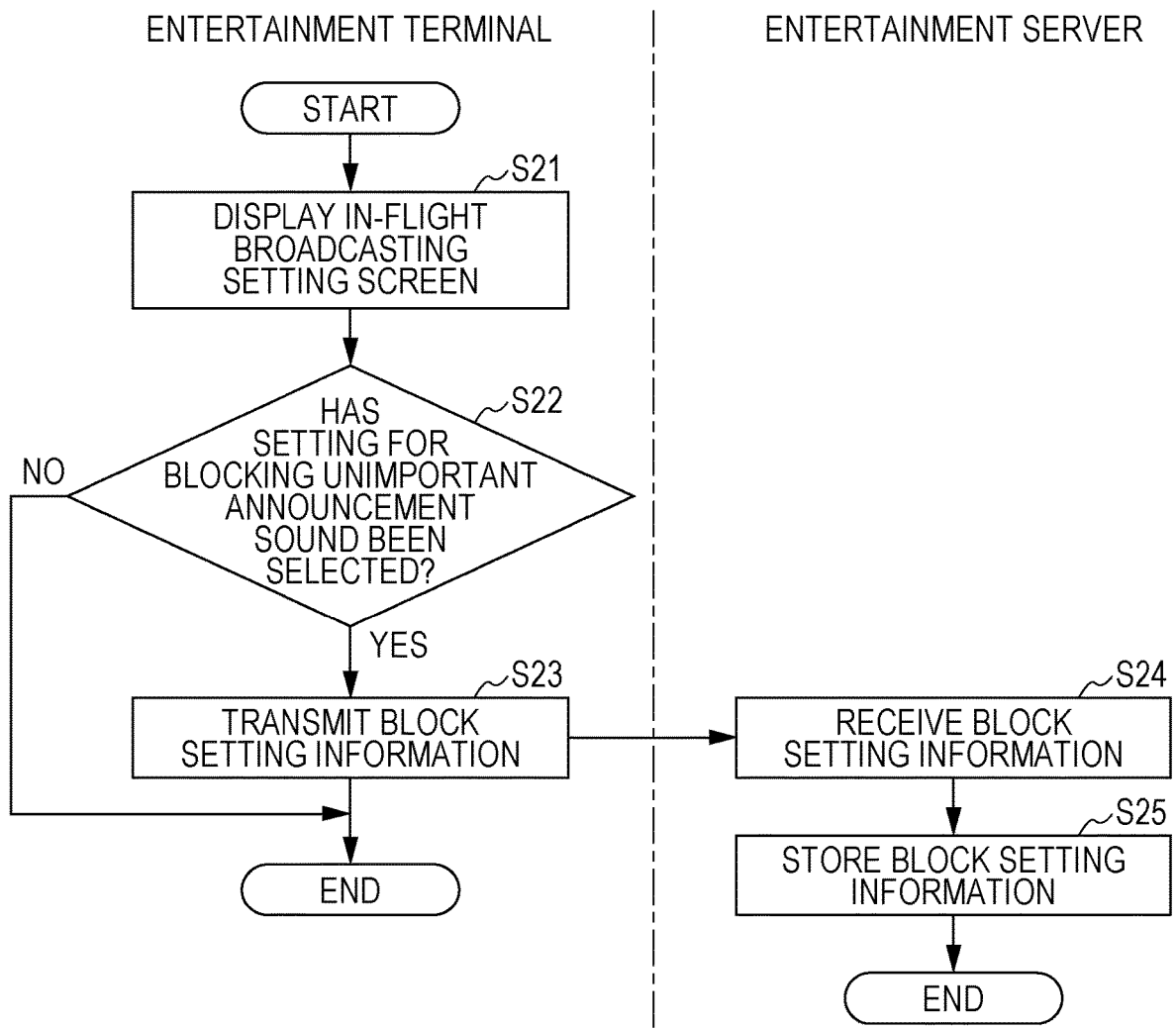
FIG. 11 is a flowchart illustrating a process for setting sound blocking performed by the entertainment terminal and the entertainment server according to the present embodiment.

FIG. 11 is a flowchart illustrating the process for setting sound blocking performed by each entertainment terminal and the entertainment server according to the present embodiment.

Figure 12:
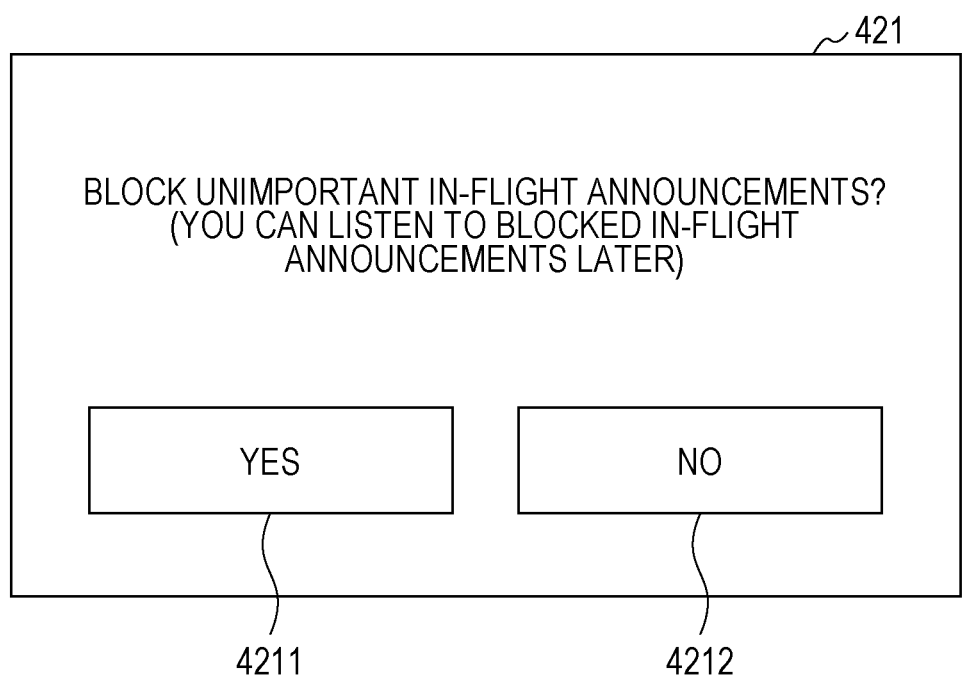
FIG. 12 is a diagram illustrating an example of an in-flight broadcasting setting screen.

First, in step S21, the block setting section 404 of the entertainment terminal 400 displays an in-flight broadcasting setting screen on the display unit 408. FIG. 12 is a diagram illustrating an example of the in-flight broadcasting setting screen. As illustrated in FIG. 12, an in-flight broadcasting setting screen 421 displays selection images for receiving selection as to whether to block unimportant announcement sounds. The display unit 408 of the entertainment terminal 400 is a touch panel, for example, and displays the selection images for receiving selection as to whether to block unimportant announcement sounds. The in-flight broadcasting setting screen 421 displays, for example, a sentence, "Block unimportant in-flight announcements?", an image 4211, "yes", selected to block unimportant announcement sounds, and an image 4212, "no", selected not to block unimportant announcement sounds. The user (passenger) touches either the image 4211 or the image 4212 to select whether to block unimportant announcement sounds.

Next, in step S22, the block setting section 404 determines whether a setting for blocking unimportant announcement sounds has been selected. If determining that the setting for blocking unimportant announcement sounds has not been selected (NO in step S22), the block setting section 404 stops displaying the in-flight broadcasting setting screen.

If determining that the setting for blocking unimportant announcement sounds has been selected (YES in step S22), on the other hand, the block setting section 404, in step S23, transmits, to the entertainment server 300, block setting information including block information indicating that unimportant announcement sounds are to be blocked and a terminal ID for identifying the entertainment terminal 400.

Next, in step S24, the communication unit 301 of the entertainment server 300 receives the block setting information transmitted from the entertainment terminal 400.

Next, in step S25, the control unit 302 stores the block setting information received by the communication unit 301 in the terminal setting information storage unit 312. As a result, the terminal setting information storage unit 312 stores the terminal ID and the block information indicating that the entertainment terminal 400 having the terminal ID is to block unimportant announcement sounds while associating the terminal ID and the block information with each other.

If a setting for not blocking unimportant announcement sounds is selected, the block setting section 404 may transmit block setting information including block information indicating that unimportant announcement sounds are not to be blocked and the terminal ID. In this case, the terminal setting information storage unit 312 stores the terminal ID and the block information indicating that the entertainment terminals 400 having the terminal ID is not to block unimportant announcement sounds while associating the terminal ID and the block information with each other.

If the entertainment terminal 400 has not set whether to block unimportant announcement sounds, the terminal setting information storage unit 312 may store the terminal ID and block information indicating that the entertainment terminal 400 having the terminal ID is not to block unimportant announcement sounds while associating the terminal ID and the block information with each other.

Next, a process for presenting an announcement sound performed by the in-flight broadcasting apparatus 100, the translation server 200, and the entertainment server 300 according to the present embodiment will be described.

Figure 13:
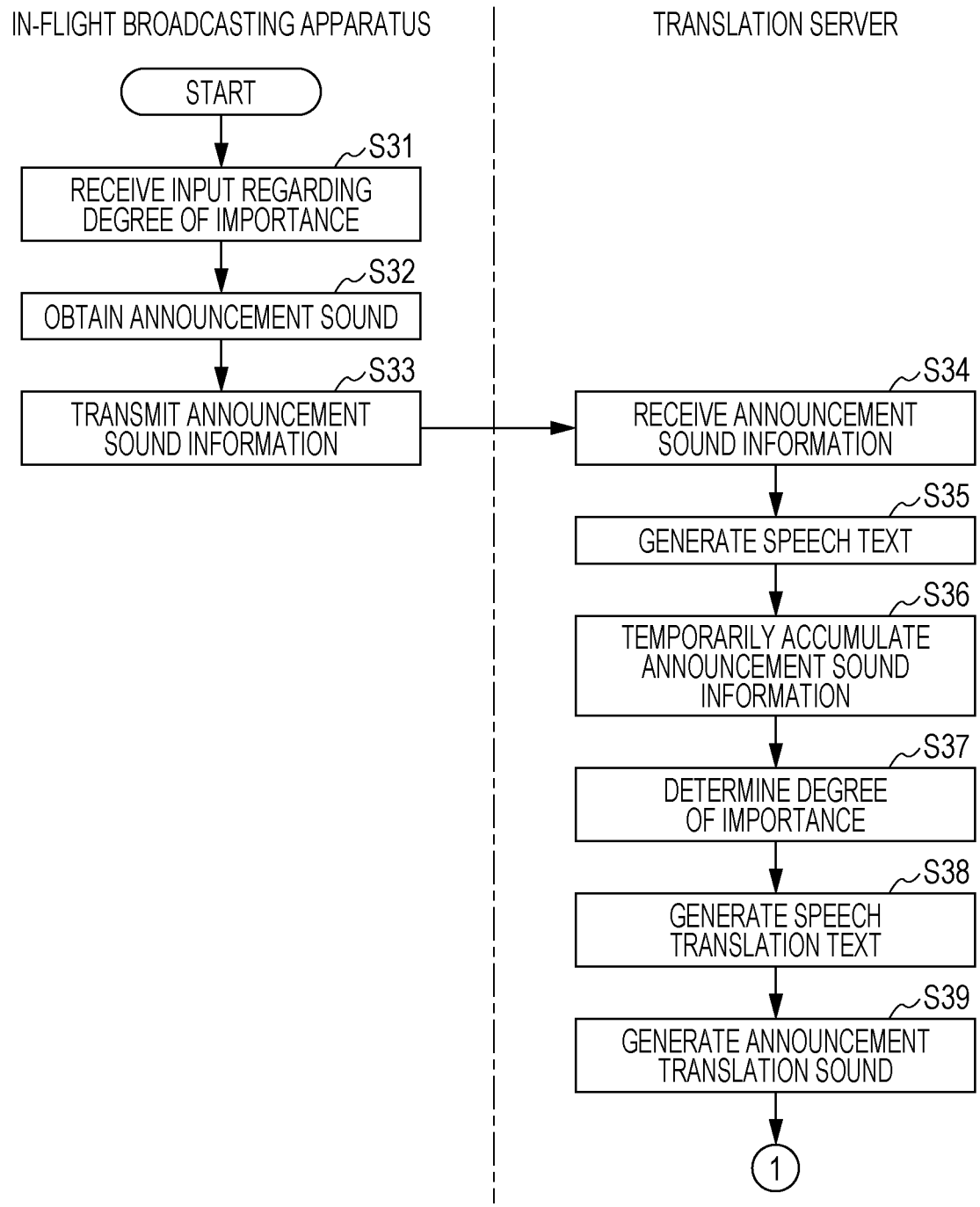
FIG. 13 is a first flowchart illustrating a process for presenting an announcement sound performed by the in-flight broadcasting apparatus, the translation server, and the entertainment server according to the present embodiment.
Figure 14:
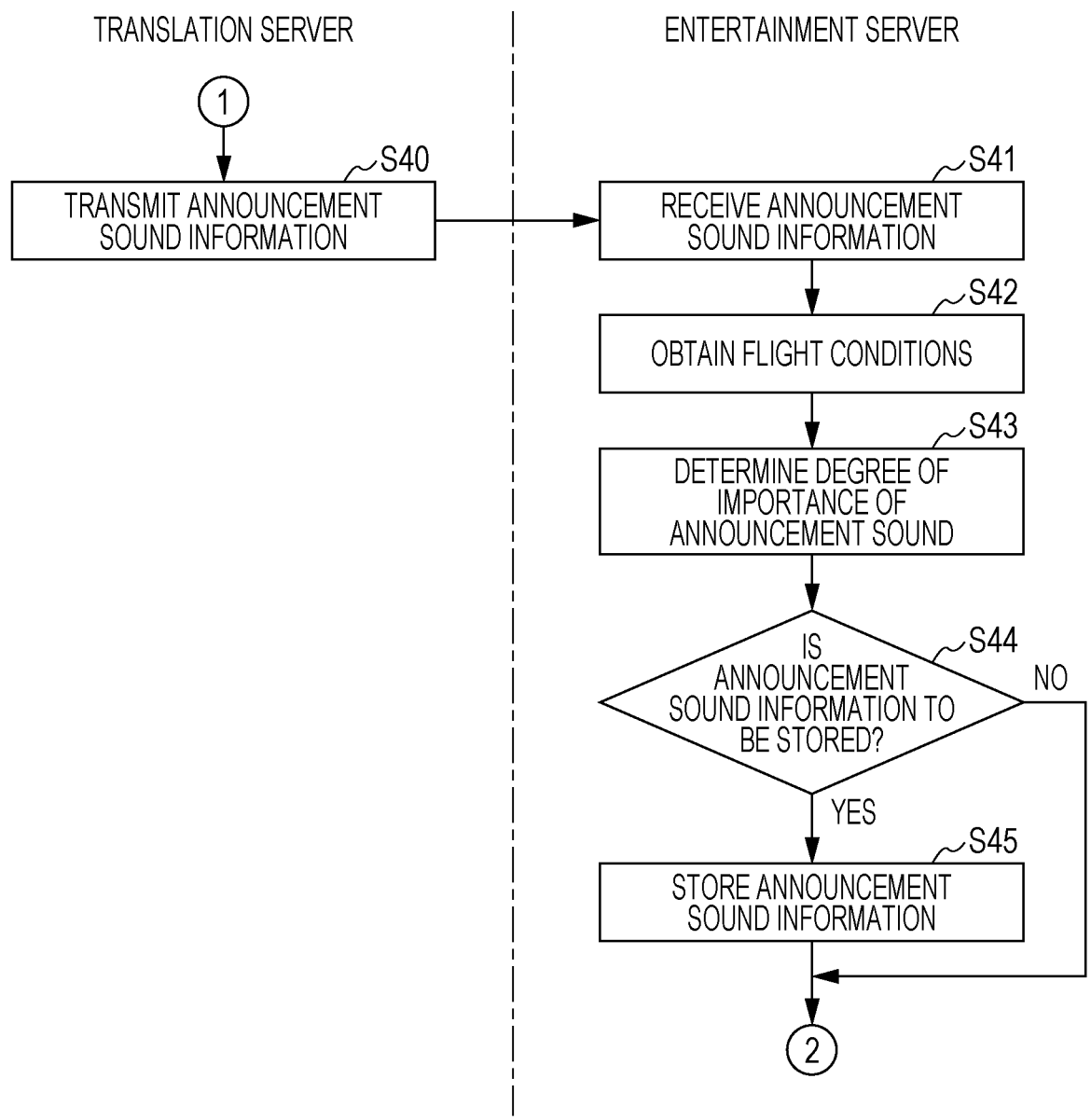
FIG. 14 is a second flowchart illustrating the process for presenting an announcement sound performed by the in-flight broadcasting apparatus, the translation server, and the entertainment server according to the present embodiment.
Figure 15:
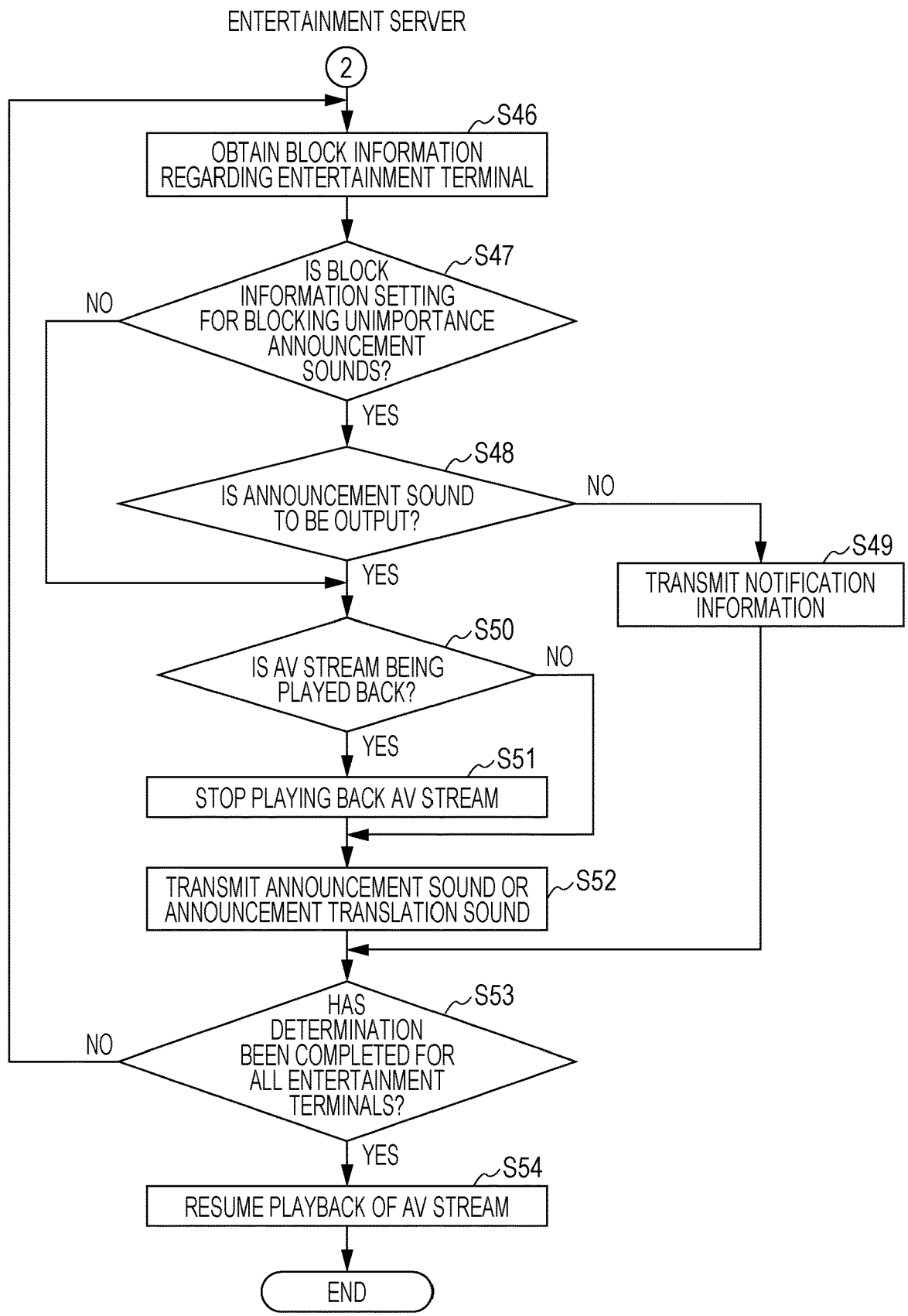
FIG. 15 is a third flowchart illustrating the process for presenting an announcement sound performed by the in-flight broadcasting apparatus, the translation server, and the entertainment server according to the present embodiment.

FIG. 13 is a first flowchart illustrating the process for presenting an announcement sound performed by the in-flight broadcasting apparatus, the translation server, and the entertainment server according to the present embodiment. FIG. 14 is a second flowchart illustrating the process for presenting an announcement sound performed by the in-flight broadcasting apparatus, the translation server, and the entertainment server according to the present embodiment. FIG. 15 is a third flowchart illustrating the process for presenting an announcement sound performed by the in-flight broadcasting apparatus, the translation server, and the entertainment server according to the present embodiment.

First, in step S31, the degree of importance input unit 102 of the in-flight broadcasting apparatus 100 receives an input regarding a degree of importance of an announcement sound uttered by the utterer. The utterer need not necessarily input a degree of importance.

Next, in step S32, the sound input unit 101 obtains the announcement sound uttered by the utterer. The sound input unit 101 may obtain an announcement sound input until silence is detected after inputting of the announcement sound starts.

Next, in step S33, the communication unit 105 transmits, to the translation server 200, announcement sound information including the announcement sound converted into a digital sound signal, language information indicating a language of the announcement sound, and the degree of importance input by the degree of importance input unit 102. If a degree of importance has not been input, the communication unit 105 transmits, to the translation server 200, announcement sound information including the announcement sound converted into the digital sound signal and the language information indicating the language of the announcement sound.

The in-flight broadcasting apparatus 100 may transmit a temporarily accumulated announcement sound to the translation server 200 or transmit an input announcement sound to the translation server 200 in real-time.

Next, in step S34, the communication unit 201 of the translation server 200 receives the announcement sound information transmitted from the in-flight broadcasting apparatus 100.

Next, in step S35, the speech recognition unit 203 generates a speech text by performing speech recognition on the announcement sound included in the announcement sound information received by the communication unit 201. The speech text is information obtained by converting the announcement sound into a text.

Next, in step S36, the control unit 202 temporarily accumulates the announcement sound information received by the communication unit 201 in the announcement sound temporary accumulation unit 207.

Next, in step S37, the degree of importance determination unit 205 refers to the degree of importance table and determines a degree of importance of a word included in the speech text. The degree of importance determination unit 205 identifies a word in the speech text that matches an important word in the degree of importance table and determines a degree of importance associated with the identified important word as a degree of importance of the speech text. If the speech text includes a word whose degree of importance is different, the degree of importance determination unit 205 may use a highest one of a plurality of degrees of importance as the degree of importance of the speech text.

The utterer may utter a word with which a degree of importance can be determined at a beginning of an announcement. The degree of importance determination unit 205 may use the degree of importance of the word at the beginning of the announcement.

Although the degree of importance is determined using an announcement sound uttered by the utterer in the present embodiment, the present disclosure is not particularly limited to this, and the degree of importance may be determined using an announcement sound recorded in advance. In this case, the utterer selects an announcement sound to be output among announcement sounds recorded in advance. The recorded announcement sounds are stored and associated with predetermined degrees of importance. The degree of importance determination unit 205 uses a degree of importance of the announcement sound selected by the utterer, that is, a degree of importance determined when the announcement sound has been recorded in advance.

Next, in step S38, the translation unit 204 generates a speech translation text by translating the speech text generated by the speech recognition unit 203. At this time, a language of the speech text can be identified on the basis of the language information included in the announcement sound information.

Next, in step S39, the speech synthesis unit 206 generates an announcement translation sound by performing speech synthesis on the speech translation text obtained by translating the speech text.

Next, in step S40, the communication unit 201 transmits, to the entertainment server 300, announcement sound information including the announcement sound received from the in-flight broadcasting apparatus 100, the speech text, the announcement translation sound obtained by translating the announcement sound into a certain language, the speech translation text, the language information indicating the language of the announcement sound, language information indicating a language of the announcement translation sound, the degree of importance determined by the degree of importance determination unit 205, the important word included in the speech text, and a translated important word included in the speech translation text.

Next, in step S41, the communication unit 301 of the entertainment server 300 receives the announcement sound information transmitted from the translation server 200.

Next, in step S42, the flight condition obtaining unit 311 obtains flight conditions of the airplane during flight.

Next, in step S43, the in-flight broadcasting priority control unit 310 determines whether a degree of priority of the announcement sound is a first degree of priority, which is a highest degree of priority, a second degree of priority, which is a second highest degree of priority, or a third degree of priority, which is a lowest degree of priority. For example, as with the degree of importance, the degree of priority can be one of three levels, namely "high", "moderate", and "low". If the degree of importance of the announcement sound is "high", the in-flight broadcasting priority control unit 310 determines the degree of priority as "high". If the degree of importance of the announcement sound is "moderate", the in-flight broadcasting priority control unit 310 determines the degree of priority as "moderate". If the degree of importance of the announcement sound is "low", the in-flight broadcasting priority control unit 310 determines the degree of priority as "low". If the flight conditions obtained by the flight condition obtaining unit 311 are certain flight conditions, the in-flight broadcasting priority control unit 310 determines the degree of priority as "high" regardless of the degree of importance of the announcement sound.

Next, in step S44, the in-flight broadcasting control unit 308 determines, on the basis of the degree of priority of the announcement sound, whether to store the announcement sound information in the announcement sound storage unit 309. If the degree of priority is the first degree of priority ("high") or the second degree of priority ("moderate"), the in-flight broadcasting control unit 308 determines that the announcement sound information is to be stored in the announcement sound storage unit 309. If the degree of priority is the third degree of priority ("low"), the in-flight broadcasting control unit 308 determines that the announcement sound information is not to be stored in the announcement sound storage unit 309.

If the degree of priority is the first degree of priority ("high"), the announcement sound is immediately output. The in-flight broadcasting control unit 308, therefore, may determine that the announcement sound information is not to be stored in the announcement sound storage unit 309.

If the in-flight broadcasting control unit 308 determines that the announcement sound information is not to be stored in the announcement sound storage unit 309 (NO in step S44), the process proceeds to processing in step S46.

If determining that the announcement sound information is to be stored in the announcement sound storage unit 309 (YES in step S44), the in-flight broadcasting control unit 308, in step S45, stores the announcement sound information in the announcement sound storage unit 309.

Next, in step S46, the in-flight broadcasting control unit 308 obtains, from the terminal setting information storage unit 312, block information associated with a terminal ID of one of the plurality of entertainment terminals 400 connected to the entertainment server 300.

Next, in step S47, the in-flight broadcasting control unit 308 determines whether the obtained block information is a setting for blocking unimportant announcement sounds. If the in-flight broadcasting control unit 308 determines that the block information is not a setting for blocking unimportant announcement sounds (NO in step S47), the process proceeds to processing in step S50.

If the block information is a setting for blocking unimportant announce sounds (YES in step S47), on the other hand, the in-flight broadcasting control unit 308, in step S48, determines whether to output the announcement sound on the basis of the degree of priority. That is, if the degree of priority is the first degree of priority ("high"), the in-flight broadcasting control unit 308 determines that the announcement sound is to be output. If the degree of priority is the second degree of priority ("moderate"), the in-flight broadcasting control unit 308 determines that the announcement sound is not to be output.

If determining that the announcement sound is not to be output (NO in step S48), the in-flight broadcasting control unit 308, in step S49, transmits, to the entertainment terminal 400, notification information for notifying the entertainment terminal 400 that the announcement sound is accumulated in the entertainment server 300.

If determining that the announcement sound is to be output (YES in step S48), on the other hand, the in-flight broadcasting control unit 308, in step S50, determines whether the entertainment terminal 400 is playing back an AV stream. Because the stream control unit 303 controls distribution of AV streams to the entertainment terminals 400, the in-flight broadcasting control unit 308 inquires of the stream control unit 303 whether the entertainment terminal 400 is playing back an AV stream.

If the in-flight broadcasting control unit 308 determines that the entertainment terminal 400 is not playing back an AV stream (NO in step S50), the process proceeds to processing in step S52.

If the in-flight broadcasting control unit 308 determines that the entertainment terminal 400 is playing back an AV stream (YES in step S50), the in-flight broadcasting control unit 308, in step S51, instructs the stream control unit 303 to stop playing back the AV stream for the entertainment terminal 400.

Next, in step S52, the in-flight broadcasting control unit 308 transmits the announcement sound or the announcement translation sound to the entertainment terminal 400. The in-flight broadcasting control unit 308 obtains language information set to the entertainment terminal 400 from the terminal setting information storage unit 312 and transmits the announcement sound or the announcement translation sound according to the obtained language information to the entertainment terminal 400. If the language of the utterer set for the in-flight broadcasting apparatus 100 and the language of the user set for the entertainment terminal 400 are the same, for example, the in-flight broadcasting control unit 308 transmits the announcement sound to the entertainment terminal 400. If the language of the utterer set for the in-flight broadcasting apparatus 100 and the language of the user set for the entertainment terminal 400 are different from each other, on the other hand, the in-flight broadcasting control unit 308 transmits the announcement translation sound corresponding to the language of the user to the entertainment terminal 400.

Next, in step S53, the in-flight broadcasting control unit 308 determines whether the determination whether to output an announcement sound has been completed for all the entertainment terminals 400. If the in-flight broadcasting control unit 308 determines that the determination whether to output an announcement sound has not been completed for all the entertainment terminals 400 (NO in step S53), the process returns to the processing in step S46. The in-flight broadcasting control unit 308 obtains, from the terminal setting information storage unit 312, block information associated with a terminal ID of one of the entertainment terminals 400 for which the determination whether to output an announcement sound has not been completed.

If determining that the determination whether to output an announcement sound has been completed for all the entertainment terminals 400 (YES in step S53), on the other hand, the in-flight broadcasting control unit 308, in step S54, instructs the stream control unit 303 to resume playing back an AV stream for the entertainment terminal 400. At this time, the stream control unit 303 resumes playing back an AV stream for all the entertainment terminals 400 for which the playback of an AV stream has been stopped.

Next, a process for playing back an announcement sound performed by each entertainment terminal 400 and the entertainment server 300 according to the present embodiment will be described.

Figure 16:
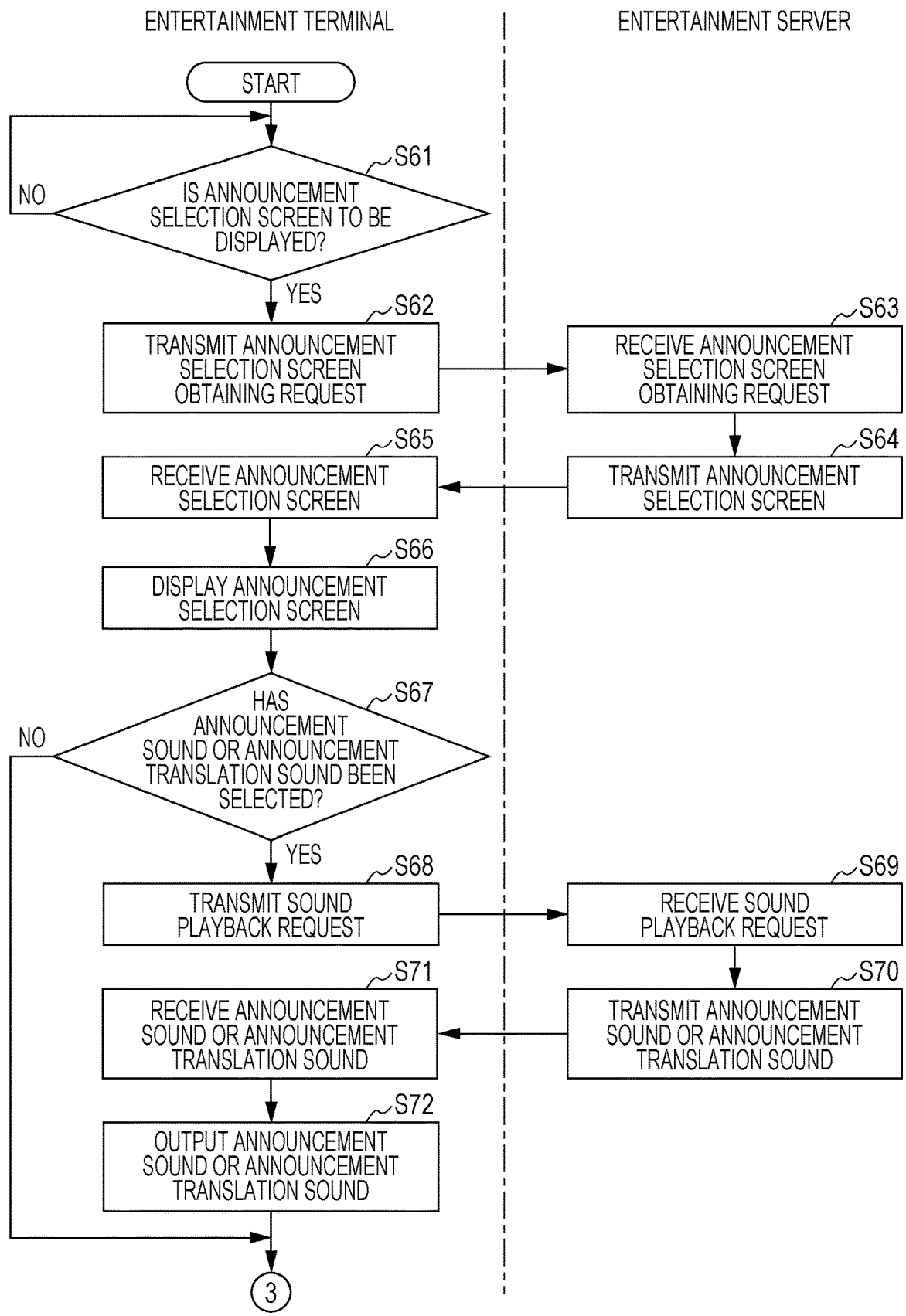
FIG. 16 is a first flowchart illustrating a process for playing back an announcement sound performed by the entertainment terminal and the entertainment server according to the present embodiment.
Figure 17:
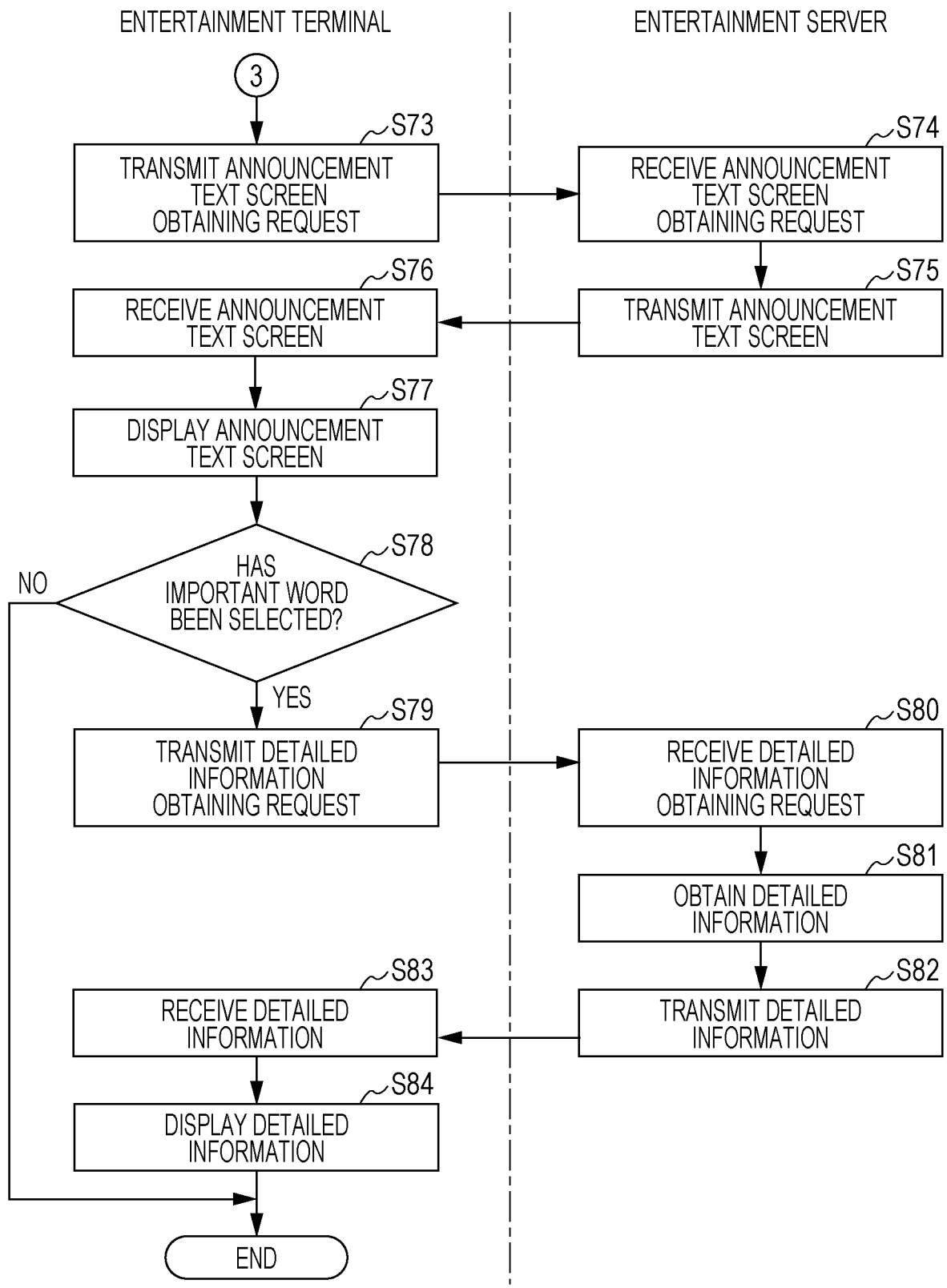
FIG. 17 is a second flowchart illustrating the process for playing back an announcement sound performed by the entertainment terminal and the entertainment server according to the present embodiment.

FIG. 16 is a first flowchart illustrating the process for playing back an announcement sound performed by each entertainment terminal and the entertainment server according to the present embodiment. FIG. 17 is a second flowchart illustrating the process for playing back an announcement sound performed by each entertainment terminal and the entertainment server according to the present embodiment.

First, in step S61, the announcement playback instruction section 405 of the entertainment terminal 400 determines whether to display an announcement selection screen for playing back an announcement sound or an announcement translation sound accumulated in the entertainment server 300. If a selection for displaying the announcement selection screen is made a menu screen, for example, the announcement playback instruction section 405 determines that the announcement selection screen is to be displayed.

If the announcement playback instruction section 405 determines that the announcement selection screen is not to be displayed (NO in step S61), the determination process in step S61 is repeated.

If determining that the announcement selection screen is to be displayed (YES in step S61), on the other hand, the announcement playback instruction section 405, in step S62, transmits an announcement selection screen obtaining request to obtain the announcement selection screen to the entertainment server 300.

Next, in step S63, the communication unit 301 of the entertainment server 300 receives the announcement selection screen obtaining request transmitted from the entertainment terminal 400.

Next, in step S64, the in-flight broadcasting control unit 308 generates the announcement selection screen using a speech text or a speech translation text included in announcement sound information stored in the announcement sound storage unit 309 and transmits the generated announcement selection screen to the entertainment terminal 400. At this time, the in-flight broadcasting control unit 308 identifies a language set for the entertainment terminal 400 that has transmitted the announcement selection screen obtaining request on the basis of language information stored in the terminal setting information storage unit 312 and generates the announcement selection screen using a speech text or a speech translation text according to the identified language.

Next, in step S65, the communication unit 406 of the entertainment terminal 400 receives the announcement selection screen transmitted from the entertainment server 300.

Figure 18:
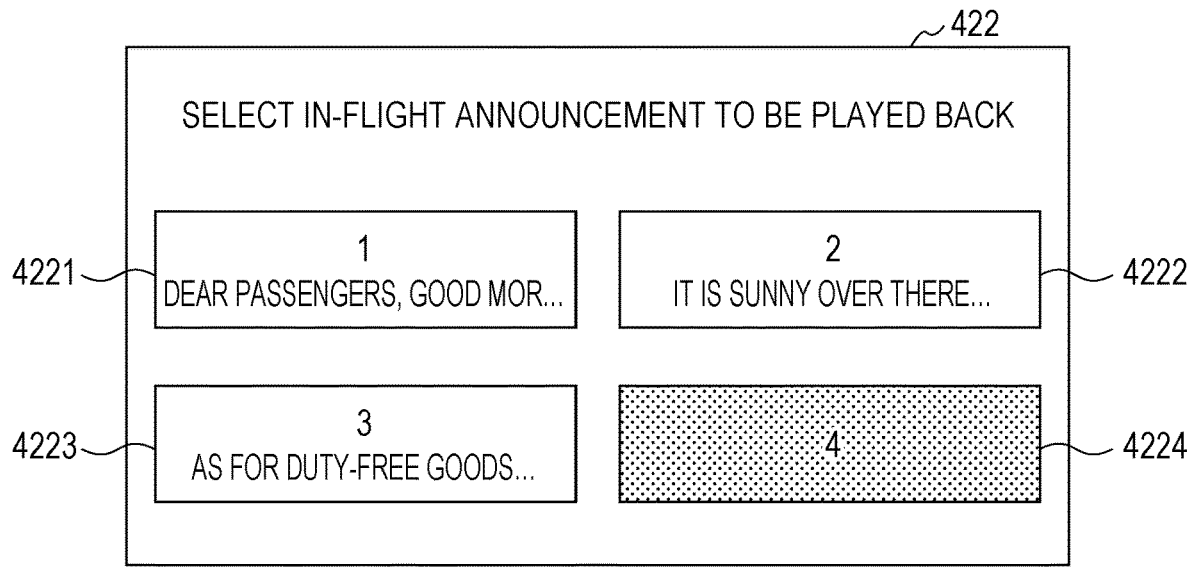
FIG. 18 is a diagram illustrating an example of an announcement selection screen.

Next, in step S66, the announcement playback instruction section 405 displays the announcement selection screen received by the communication unit 406 on the display unit 408. FIG. 18 is a diagram illustrating an example of the announcement selection screen. In an announcement selection screen 422, as illustrated in FIG. 18, selection images 4221, 4222, 4223, and 4224 indicating a plurality of announcement sounds are displayed in a selectable manner. In the selection images 4221, 4222, and 4223, beginnings of speech texts of announcement sounds or speech translation texts of announcement translation sounds are displayed. The user can estimate the content of the announcement sounds or the announcement translation sounds by taking a look at the beginnings of the speech texts or the speech translation texts included in the selection images 4221, 4222, and 4223 and select a desired announcement sound or announcement translation sound.

Next, in step S67, the announcement playback instruction section 405 determines whether an announcement sound or an announcement translation sound has been selected in the announcement selection screen. If the announcement playback instruction section 405 determines that an announcement sound or an announcement translation sound has not been selected (NO in step S67), the announcement playback instruction section 405 stops displaying the announcement selection screen.

If determining that an announcement sound or an announcement translation sound has been selected (YES in step S67), the announcement playback instruction section 405, in step S68, transmits, to the entertainment server 300, a sound playback request to play back the selected announcement sound or announcement translation sound.

Next, in step S69, the communication unit 301 of the entertainment server 300 receives the sound playback request transmitted from the entertainment terminal 400.

Next, in step S70, the in-flight broadcasting control unit 308 reads, from the announcement sound storage unit 309, the announcement sound or the announcement translation sound requested through the sound playback request and transmits the read announcement sound or announcement translation sound to the entertainment terminal 400.

Next, in step S71, the communication unit 406 of the entertainment terminal 400 receives the announcement sound or the announcement translation sound transmitted from the entertainment server 300.

Next, in step S72, the announcement playback instruction section 405 outputs, from the sound output unit 410, the announcement sound or the announcement translation sound received by the communication unit 406.

Since an announcement sound or an announcement translation sound that has already been broadcast is stored, the user can listen to the stored announcement sound or announcement translation sound later.

Next, in step S73, the announcement playback instruction section 405 of the entertainment terminal 400 transmits, to the entertainment server 300, an announcement text screen obtaining request to obtain an announcement text screen for displaying a speech text or a speech translation text accumulated in the entertainment server 300. That is, the entertainment terminal 400 can display a text image obtained by converting an announcement sound into a text in such a way as to emphasize important words included in the text image in a selectable manner. If the user selects an important word, the entertainment terminal 400 can display detailed information that describes the important word in detail.

Next, in step S74, the communication unit 301 of the entertainment server 300 receives the announcement text screen obtaining request transmitted from the entertainment terminal 400.

Next, in step S75, the GUI control unit 305 generates the announcement text screen using a speech text or a speech translation text included in the announcement sound information stored in the announcement sound storage unit 309 and transmits the generated announcement text screen to the entertainment terminal 400. At this time, the GUI control unit 305 identifies a language set for the entertainment terminal 400 that has transmitted the announcement text screen obtaining request on the basis of the language information stored in the terminal setting information storage unit 312 and generates the announcement text screen using a speech text or a speech translation text according to the identified language.

Next, in step S76, the communication unit 406 of the entertainment terminal 400 receives the announcement text screen transmitted from the entertainment server 300.

Figure 19:
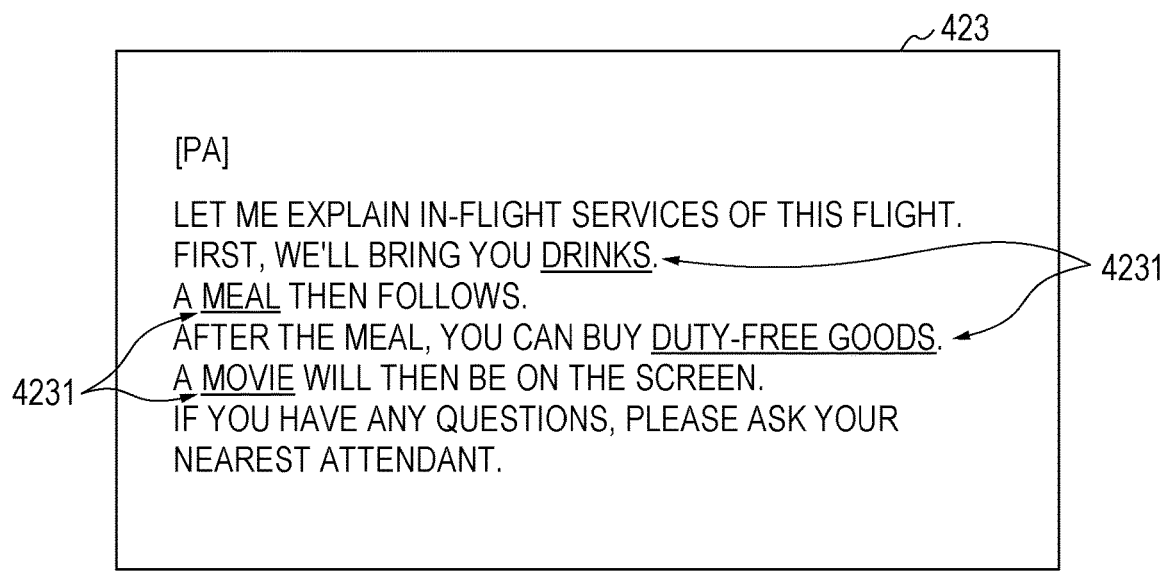
FIG. 19 is a diagram illustrating an example of an announcement text screen.

Next, in step S77, the announcement playback instruction section 405 displays the announcement text screen received from the communication unit 406 on the display unit 408. FIG. 19 is a diagram illustrating an example of the announcement text screen. In an announcement text screen 423, as illustrated in FIG. 19, a speech text of the announcement sound or a speech translation text of the announcement translation sound selected in the announcement selection screen 422 is displayed. In addition, in the announcement text screen 423, important words 4231 included in the speech text or the speech translation texts are emphasized in a selectable manner. The important words 4231 are displayed in a mode different from one for other words. For example, the important words 4231 may be displayed in letters thicker than other letters or in a color different from one for other letters. In addition, the important words 4231 may be underlined. The user can select, among the important words 4231 included in the announcement text screen 423, an important word of which the user needs detailed description.

Next, in step S78, the announcement playback instruction section 405 determines whether an important word has been selected in the announcement text screen. If the announcement playback instruction section 405 determines that an important word has not been selected (NO in step S78), the announcement playback instruction section 405 stops displaying the announcement text screen.

If determining that an important word has been selected (YES in step S78), on the other hand, the announcement playback instruction section 405, in step S79, transmits, to the entertainment server 300, a detailed information obtaining request to display detailed information regarding the selected important word.

Next, in step S80, the communication unit 301 of the entertainment server 300 receives the detailed information obtaining request transmitted from the entertainment terminal 400.

Next, in step S81, the GUI control unit 305 obtains, from the detailed information storage unit 307, the detailed information regarding the important word requested through the detailed information obtaining request.

Next, in step S82, the GUI control unit 305 transmits the obtained detailed information to the entertainment terminal 400.

Next, in step S83, the communication unit 406 of the entertainment terminal 400 receives the detailed information transmitted from the entertainment server 300.

Figure 20:
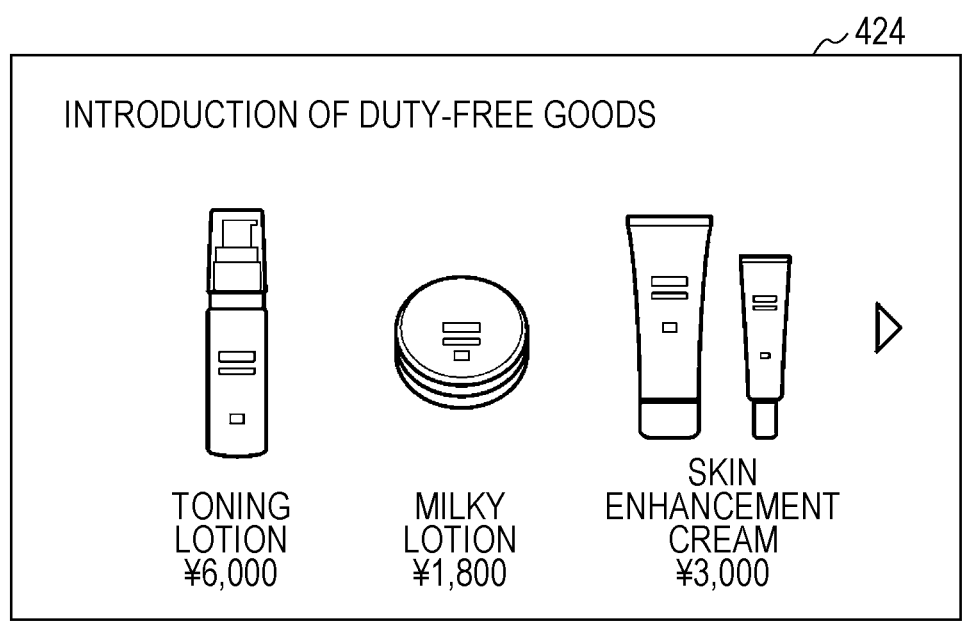
FIG. 20 is a diagram illustrating an example of a detailed information display screen.

Next, in step S84, the announcement playback instruction section 405 displays the detailed information received by the communication unit 406 on the display unit 408. FIG. 20 is a diagram illustrating an example of a detailed information display screen. In a detailed information display screen 424, as illustrated in FIG. 20, detailed information describing an important word in detail is displayed. The detailed information display screen 424 illustrated in FIG. 20 indicates detailed information displayed when one of the important words 4231 included in the announcement text screen 423 illustrated in FIG. 19, namely "duty-free goods", has been selected.

Although the announcement text screen is displayed after the announcement sound or the announcement translation sound is output in the process illustrated in FIGS. 16 and 17, the present disclosure is not particularly limited to this. The announcement text screen need not be displayed after the announcement sound or the announcement translation sound is output.

In addition, after the announcement selection screen is displayed in step S66 and a desired announcement sound or announcement translation sound is selected in step S67, the announcement text screen obtaining request may be transmitted without transmitting the sound playback request. In this case, the announcement text screen is displayed without outputting the announcement sound or the announcement translation sound.

Although the sound presentation system according to the present embodiment is provided inside an airplane, the present disclosure is not particularly limited to this. For example, the sound presentation system may be provided for a public transportation system such as a train or a bus.

In the above embodiment, the components may be achieved by dedicated hardware or by executing software programs suitable therefor. Operations and functions of the components may be achieved when a program execution unit such as a CPU or a processor has read and executed software programs recorded in a computer-readable recording medium such as a hard disk or a semiconductor memory.

Data used in order to achieve the operations or the functions of the components may be a writable recording medium such as a semiconductor memory or a hard disk.

A method for presenting a sound, a sound presentation program, the sound presentation system, and a terminal apparatus according to the present disclosure are capable of presenting announcement sound whose degrees of importance are high to a user, blocking announcement sounds whose degrees of importance are low without presenting the announcement sounds to the user, and improving the comfort of the user and effective as a method for presenting a sound, a sound presentation program, a sound presentation system, and a terminal apparatus that present, to the user, announcement sounds announced from an utterer to the user.

What is claimed is:

1. A method for presenting a sound, the method comprising:
    obtaining an announcement sound announced from an utterer to a user in an airplane;
    obtaining a degree of importance of the announcement sound;
    when the degree of importance is a first degree of importance, determining that the announcement sound is to be presented to the user;
    when the degree of importance is a second degree of importance, which is lower than the first degree of importance, determining, that the announcement sound is not to be presented to the user and storing the announcement sound of the second degree of importance in a sound storage;
    when the degree of importance is a third degree of importance, which is lower than the second degree of importance, determining that the announcement sound is not to be presented to the user;
    in response to determining that the announcement sound is to be presented to the user, transmitting the announcement sound to a terminal apparatus used by the user; and
    in response to determining that the announcement sound is not to be presented to the user and a request to obtain the announcement sound stored in the sound storage is received from the terminal apparatus, reading the announcement sound from the sound storage and transmitting the announcement sound read from the sound storage to the terminal apparatus.

2. The method according to claim 1, further comprising:
    generating a speech text by performing speech recognition on the announcement sound,
    wherein the obtaining the degree of importance includes:
    referring to a degree of importance storage storing the degree of importance of announcement and a word while associating the degree of importance and the word with each other; and
    determining, based on the degree of importance storage, the degree of importance associated with a word included in the speech text.

3. The method according to claim 2,
    wherein a first language used by the utterer for speech and a second language used by the user for speech are different from each other,
    wherein the method further comprises:
    generating a speech translation text by translating the speech text into the second language; and
    generating an announcement translation sound by performing speech synthesis on the speech translation text;

wherein, the transmitting the announcement sound transmits the announcement translation sound to the terminal apparatus.

4. The method according to claim 1,
wherein the obtaining the degree of importance includes receiving an input regarding the degree of importance of the announcement sound uttered by the utterer.

5. The method according to claim 1, further comprising:
obtaining a condition around the user; and
determining, when the obtained condition is a certain condition, that the announcement sound is to be presented to the user.

6. The method according to claim 5,
wherein the condition is a weather condition that changes during flight of the airplane boarded by the user.

7. The method according to claim 1, further comprising:
receiving, from the terminal apparatus, block information indicating whether the announcement sound having a certain degree of importance is to be blocked,
wherein the announcement sound is determined to be presented when the degree of importance is the first degree of importance and the block information indicates that the announcement sound is not to be blocked.

8. The method according to claim 1, further comprising:
in response to determining that the announcement sound is not to be presented to the user, transmitting notification information for notifying the user that the announcement sound is accumulated.

9. The method according to claim 1, further comprising:
receiving, from the terminal apparatus, a request to obtain detailed information regarding a certain part of the announcement sound transmitted to the terminal apparatus; and
transmitting the detailed information to the terminal apparatus.

10. A non-transitory recording medium storing thereon a computer program, which, when executed by a processor, causes the processor to perform operations comprising:
obtaining an announcement sound announced from an utterer to a user in an airplane;
obtaining a degree of importance of the announcement sound;
when the degree of importance is a first degree of importance, determining that the announcement sound is to be presented to the user;
when the degree of importance is a second degree of importance, which is lower than the first degree of importance, determining that the announcement sound is not to be presented to the user and storing the announcement sound of the second degree of importance in a sound storage;
when the degree of importance is a third degree of importance, which is lower than the second degree of importance, determining that the announcement sound is not to be presented to the user;

in response to determining that the announcement sound is to be presented to the user, transmitting the announcement sound to a terminal apparatus used by the user; and
in response to determining that the announcement sound is not to be presented to the user and a request to obtain the announcement sound stored in the sound storage is received from the terminal apparatus, reading the announcement sound from the sound storage and transmitting the announcement sound read from the sound storage to the terminal apparatus.

11. A system comprising:
a server; and
a terminal apparatus communicably connected to the server and used by a user,
wherein the server includes
a first processor, and
a first memory storing a computer program, which, when executed by the first processor, causes the first processor to perform operations including:
obtaining an announcement sound announced from an utterer to the user in an airplane,
obtaining a degree of importance of the announcement sound,
when the degree of importance is a first degree of importance, determining that the announcement sound is to be presented to the user,
when the degree of importance is a second degree of importance, which is lower than the first degree of importance, determining that the announcement sound is not to be presented to the user and storing the announcement sound having second degree of importance in a sound storage,
when the degree of importance is a third degree of importance, which is lower than the second degree of importance, determining that the announcement sound is not to be presented to the user,
in response to determining that the announcement sound is to be presented to the user, transmitting the announcement sound to a terminal apparatus used by the user, and
in response to determining that the announcement sound is not to be presented to the user and a request to obtain the announcement sound stored in the sound storage is received from the terminal apparatus, reading the announcement sound from the sound storage and transmitting the announcement sound read from the sound storage to the terminal apparatus, and
wherein the terminal apparatus includes:
a second processor, and
a second memory storing a computer program, which, when executed by the second processor, causes the second processor to perform operations including:
receiving the announcement sound, and
outputting the announcement sound.

* * * * *